US012657992B2

(12) United States Patent
Rodd et al.

(10) Patent No.: US 12,657,992 B2
(45) Date of Patent: Jun. 16, 2026

(54) DUAL-LATCH MECHANISM

(71) Applicant: Aristocrat Technologies, Inc., Las Vegas, NV (US)

(72) Inventors: Donald Rodd, Las Vegas, NV (US); Brian Goldstein, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 226 days.

(21) Appl. No.: 18/466,752

(22) Filed: Sep. 13, 2023

(65) Prior Publication Data

US 2025/0087047 A1 Mar. 13, 2025

(51) Int. Cl.
*G07F 17/32* (2006.01)
*E05B 65/00* (2006.01)

(52) U.S. Cl.
CPC ........ *G07F 17/3216* (2013.01); *E05B 65/006* (2013.01)

(58) Field of Classification Search
CPC .................................................. G07F 17/3216
See application file for complete search history.

(56) References Cited

U.S. PATENT DOCUMENTS

| | | | | |
|---|---|---|---|---|
| 8,795,070 | B2 | 8/2014 | Beadell | |
| 10,815,697 | B1 * | 10/2020 | Weinerman | E05B 47/0012 |
| 10,825,286 | B2 | 11/2020 | Gallagher | |
| 11,043,065 | B2 | 6/2021 | Mcnierney | |
| 11,587,392 | B2 | 2/2023 | Tillery | |
| 2019/0316391 | A1 * | 10/2019 | Bacon | E05B 59/00 |
| 2020/0131864 | A1 * | 4/2020 | Slack | E21B 19/06 |
| 2022/0392290 | A1 | 12/2022 | Voloh | |
| 2025/0146329 | A1 * | 5/2025 | Rodd | E05B 61/00 |

* cited by examiner

*Primary Examiner* — Eugene L Kim
(74) *Attorney, Agent, or Firm* — Weaver Austin Villeneuve & Sampson LLP

(57) ABSTRACT

Dual-latch mechanisms are provided that allow two (or more) latches to be simultaneously released in response to a single input received via an actuator.

19 Claims, 20 Drawing Sheets

DUAL-LATCH MECHANISM

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Electronic gaming machines are complex devices and are often housed within cabinets having multiple access points in the form of doors or trays that may be opened or slid out in order to access internal components, cables, connectors, etc.

SUMMARY

Disclosed herein are dual-latch mechanisms that may be particularly well-suited for use in electronic gaming machines. As indicated above, electronic gaming machines often have access panels or doors, or slide-out trays, that may be opened or slid out in order to access internal components of such devices, e.g., for maintenance or repair purposes. Such electronic gaming machines may include various latch mechanisms that may be used to secure such access panels or doors or slide-out trays in place, thereby preventing such access routes from inadvertently opening, e.g., in response to vibration or impact.

Disclosed herein are dual-latch mechanisms that incorporate at least one pair of latches that are able to both be transitioned from a latched state to an unlatched state simultaneously responsive to a single input provided to a corresponding actuator, e.g., a button or lever. In some such dual-latch mechanisms, two pair of latches may be provided, with each pair of latches being able to be transitioned from the latched state to the unlatched state simultaneously responsive to a single corresponding input provided to a corresponding actuator. In some such implementations, both actuators may be positioned such that a single input may simultaneously actuate both actuators, thereby causing both pairs of latches to simultaneously unlatch.

Such dual-latch mechanisms may be particularly well-suited for latching doors or trays in situations in which it is desirable to provide multiple points of securement to the item being latched. For example, an access door that has a single latch point may be more vulnerable to being pried open or being twisted about the single latch point than if it were to be latched at two separate, spaced-apart locations. Moreover, such dual-latch mechanisms may also be well-suited for use in mechanisms in which multiple latch points must be released simultaneously. For example, some electronic gaming machines have a button deck, which generally refers to a ledge that contains the buttons and/or touch-screen interfaces used to provide input to the electronic gaming machine, that is mounted on glides, allowing the button deck to be slid out horizontally, like a drawer. If a single latch point is used to secure such a button deck, there is a risk that the button deck may be subjected to an off-center load during latching, e.g., by a person pushing on a corner of the button deck, which may, in turn, cause the button deck to be torqued about a vertical axis. This loading may subject the glides to bending moments that may damage the glides. If a dual-latch mechanism is used to secure such a button deck, the two latch points may be positioned such that such potential bending moments on the glides are greatly reduced, thereby reducing the potential for damage to the glides. Moreover, the simultaneous-release aspect of the dual-latch mechanisms discussed herein may also prevent staggered unlatching of secured items, thereby preventing the secured items from being released in a skewed or uneven manner.

In some implementations, an apparatus may be provided that includes a support bracket, a plurality of rotary latches, and a first common actuator bar. Each rotary latch may be mounted to the support bracket, have a corresponding trigger that is movable between an untriggered state and a triggered state, and have one or more latching members that are movable between a latched position and an unlatched position. Each rotary latch may be configured such that the corresponding trigger obstructs movement of the one or more latching members of that rotary latch from the latched position to the unlatched position when the corresponding trigger of that rotary latch is in the untriggered state and the one or more latching members of that rotary latch are in the latched position, and enables movement of the one or more latch members of that rotary latch from the latched position to the unlatched position when the corresponding trigger of that rotary latch is in the triggered state and the one or more latching members of that rotary latch are in the latched position. The plurality of rotary latches may include at least a first rotary latch and a second rotary latch. The first common actuator bar may be secured to the support bracket such that the first common actuator bar is translatable along a first axis relative to the support bracket and configured to be translatable between a first position relative to the support bracket and a second position relative to the support bracket. The first common actuator bar and the first and second rotary latches may be configured such that the first common actuator bar, in moving from the first position to the second position, exerts a lateral force on the triggers of the first and second rotary latches, thereby causing the triggers of the first and second rotary latches to transition from the untriggered state to the triggered state.

In some such implementations, the apparatus may further include a first actuator. The first actuator may be movably mounted to the support bracket such that the first actuator is movable between a first actuation position relative to the support bracket and a second actuation position relative to the support bracket. The first actuator may also be kinematically linked to the first common actuator bar such that the first common actuator bar moves from the first position to the second position responsive to the first actuator being moved from the first actuation position to the second actuation position and such that the first common actuator bar moves from the second position to the first position responsive to the first actuator being moved from the second actuation position to the first actuation position.

In some such implementations, the first actuator may be constrained to move along a second axis relative to the support bracket. In some further such implementations, the second axis may be perpendicular to a first reference plane that is parallel to the first axis.

In some implementations, the apparatus may further include a first sliding member that is secured to the support bracket such that the first sliding member is translatable along a third axis relative to the support bracket, a first driving link having a first end and an opposing second end, and a first driven link having a first end and an opposing second end. The first end of the first driving link may be rotatably connected with the first actuator, the second end of the first driving link may be rotatably connected with the first sliding member, the first end of the first driven link may be rotatably connected with the first sliding member, and the second end of the first driven link may be rotatably connected with the first common actuator bar.

In some such implementations, the third axis may be perpendicular to a second reference plane that is parallel to the first axis. In some further such implementations, the second axis may be at an oblique angle to the second reference plane.

In some implementations, the first driving link may be rotatable relative to the first actuator and about a first rotational axis that is parallel to the first axis, and the first driven link may be rotatable relative to the first sliding member and about a second rotational axis that is a) parallel to a plane that is parallel to the first axis and b) perpendicular to another plane that is parallel to both the first axis and the third axis.

In some implementations, the apparatus may further include a second common actuator bar, the plurality of rotary latches may further includes at least a third rotary latch and a fourth rotary latch, the second common actuator bar may be secured to the support bracket such that the second common actuator bar is translatable along a fourth axis relative to the support bracket, the second common actuator bar may be configured to be translatable between a third position relative to the support bracket and a fourth position relative to the support bracket, and the second common actuator bar and the third and fourth rotary latches may be configured such that the second common actuator bar, in moving from the third position to the fourth position, exerts a lateral force on the triggers of the third and fourth rotary latches, thereby causing the triggers of the third and fourth rotary latches to transition from the untriggered state to the triggered state.

In some implementations of the apparatus, the apparatus may further include a second actuator. The second actuator may be movably mounted to the support bracket such that the second actuator is movable between a third actuation position relative to the support bracket and a fourth actuation position relative to the support bracket. The second actuator may also be kinematically linked to the second common actuator bar such that the second common actuator bar moves from the third position to the fourth position responsive to the second actuator being moved from the third actuation position to the fourth actuation position, and such that the second common actuator bar moves from the fourth position to the third position responsive to the second actuator being moved from the fourth actuation position to the third actuation position.

In some such implementations, the second actuator may be constrained to move along a fifth axis relative to the support bracket. In some further such implementations, the fifth axis may be perpendicular to a fourth reference plane that is parallel to the fourth axis.

In some implementations, the apparatus may further include a second sliding member secured to the support bracket such that the second sliding member is translatable along a sixth axis relative to the support bracket, a second driving link having a first end and an opposing second end, and a second driven link having a first end and an opposing second end. The first end of the second driving link may be rotatably connected with the second actuator, the second end of the second driving link may be rotatably connected with the second sliding member, the first end of the second driven link may be rotatably connected with the second sliding member, and the second end of the second driven link may be rotatably connected with the second common actuator bar.

In some such implementations, the sixth axis may be perpendicular to a fifth reference plane that is parallel to the fourth axis. In some further such implementations, the fifth axis may be at an oblique angle to the fifth reference plane.

In some implementations of the apparatus, the second driving link may be rotatable relative to the second actuator and about a third rotational axis that is parallel to the fourth axis, and the second driven link may be rotatable relative to the second sliding member and about a fourth rotational axis that is a) parallel to a fifth reference plane that is parallel to the fourth axis and b) perpendicular to a sixth reference plane that is parallel to both the fourth axis and the sixth axis.

In some implementations of the apparatus, the first actuator may be adjacent to the second actuator. In some other such implementations, the first actuator may be adjacent to the second actuator and the second axis may be parallel to the fifth axis.

In some implementations, the apparatus may further include a gaming machine cabinet having a door and a sliding tray. The door may include a first latch strike and a second latch strike, and the sliding tray may include a third latch strike and a fourth latch strike. The door may be movable between an open configuration and a closed configuration, and the sliding tray may be movable between an extended position and a retracted position. The support bracket may be positioned within the gaming machine cabinet such that, when the door is in the closed configuration and the sliding tray is in the retracted position, the first latch strike engages with, and is secured by, the first rotary latch, the second latch strike engages with, and is secured by, the second rotary latch, the third latch strike engages with, and is secured by, the third rotary latch, and the fourth latch strike engages with, and is secured by, the fourth rotary latch.

In some implementations, the apparatus may further include a gaming machine cabinet having a door. The door may include a first latch strike and a second latch strike and be movable between an open configuration and a closed configuration. The support bracket may be positioned within the gaming machine cabinet such that, when the door is in the closed configuration, the first latch strike engages with, and is secured by, the first rotary latch and the second latch strike engages with, and is secured by, the second rotary latch.

The Figures are provided for the purpose of providing examples and clarity regarding various aspects of this disclosure and are not intended to be limiting.

DETAILED DESCRIPTION

The following discussion provides overall context for electronic gaming machines, some of which may include dual-latch mechanisms such as those discussed later herein with respect to FIG. 4 onwards.

Figure 1:
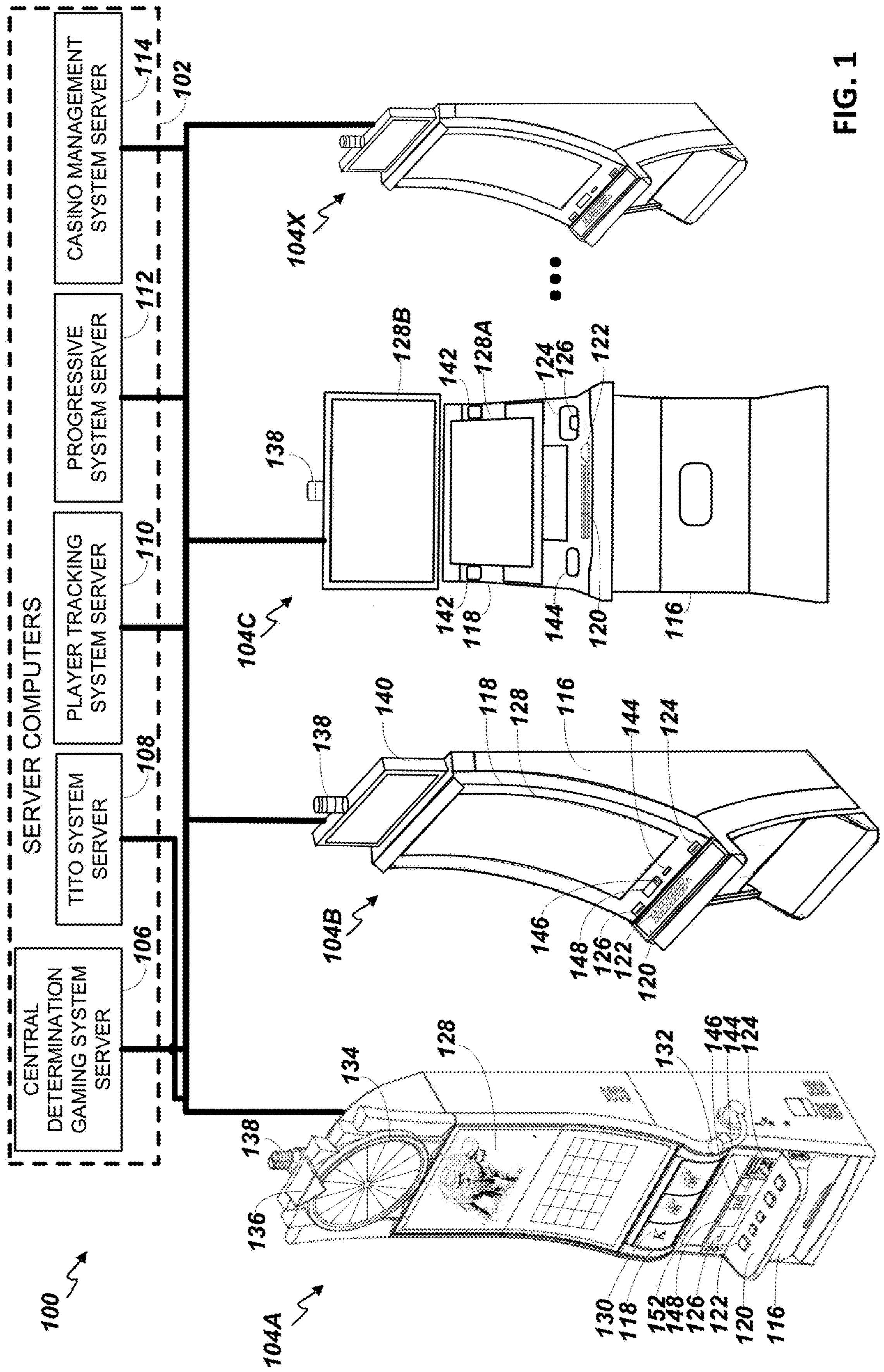
FIG. 1 is an exemplary diagram showing several EGMs networked with various gaming-related servers.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
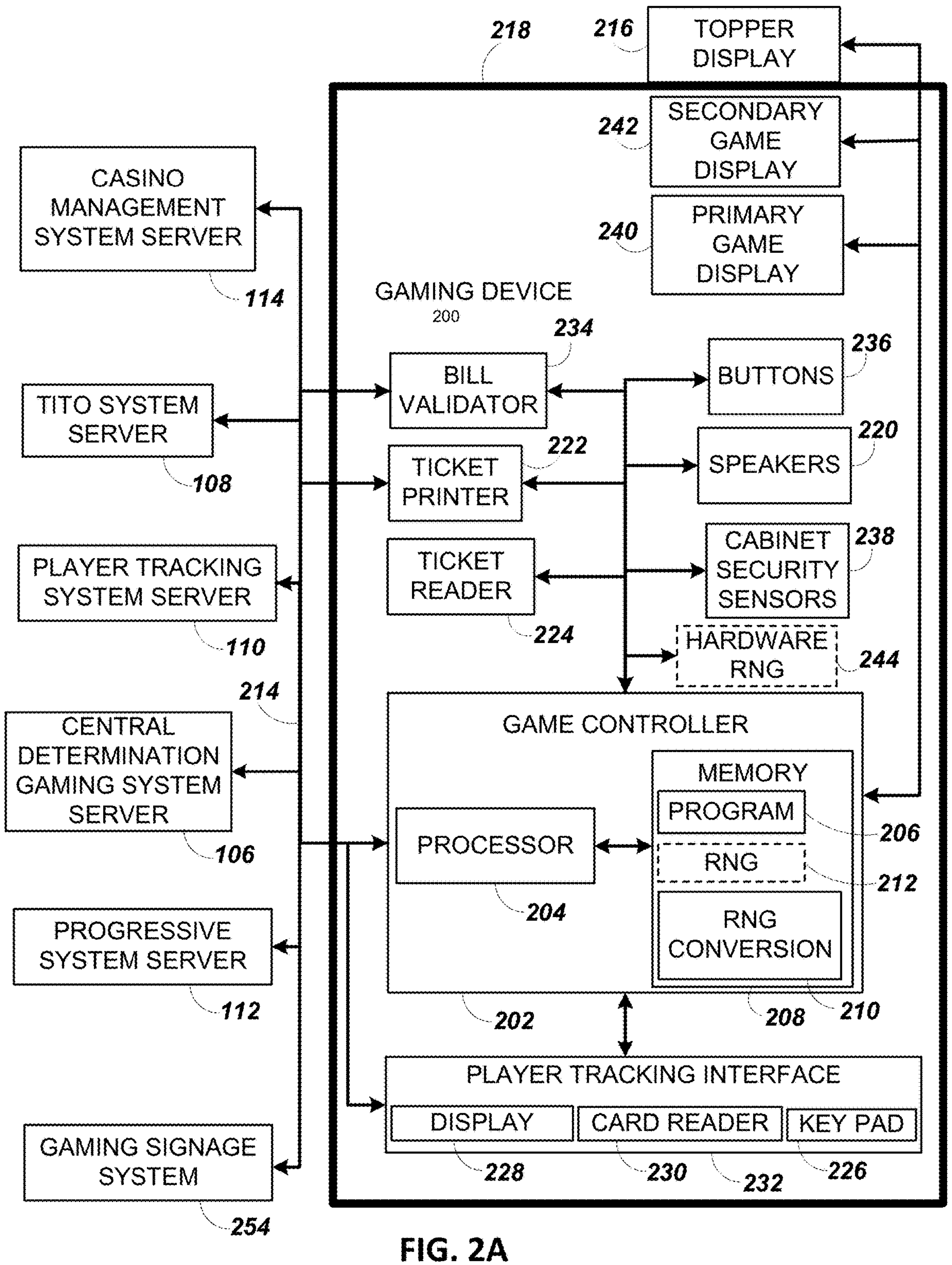
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218.

Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
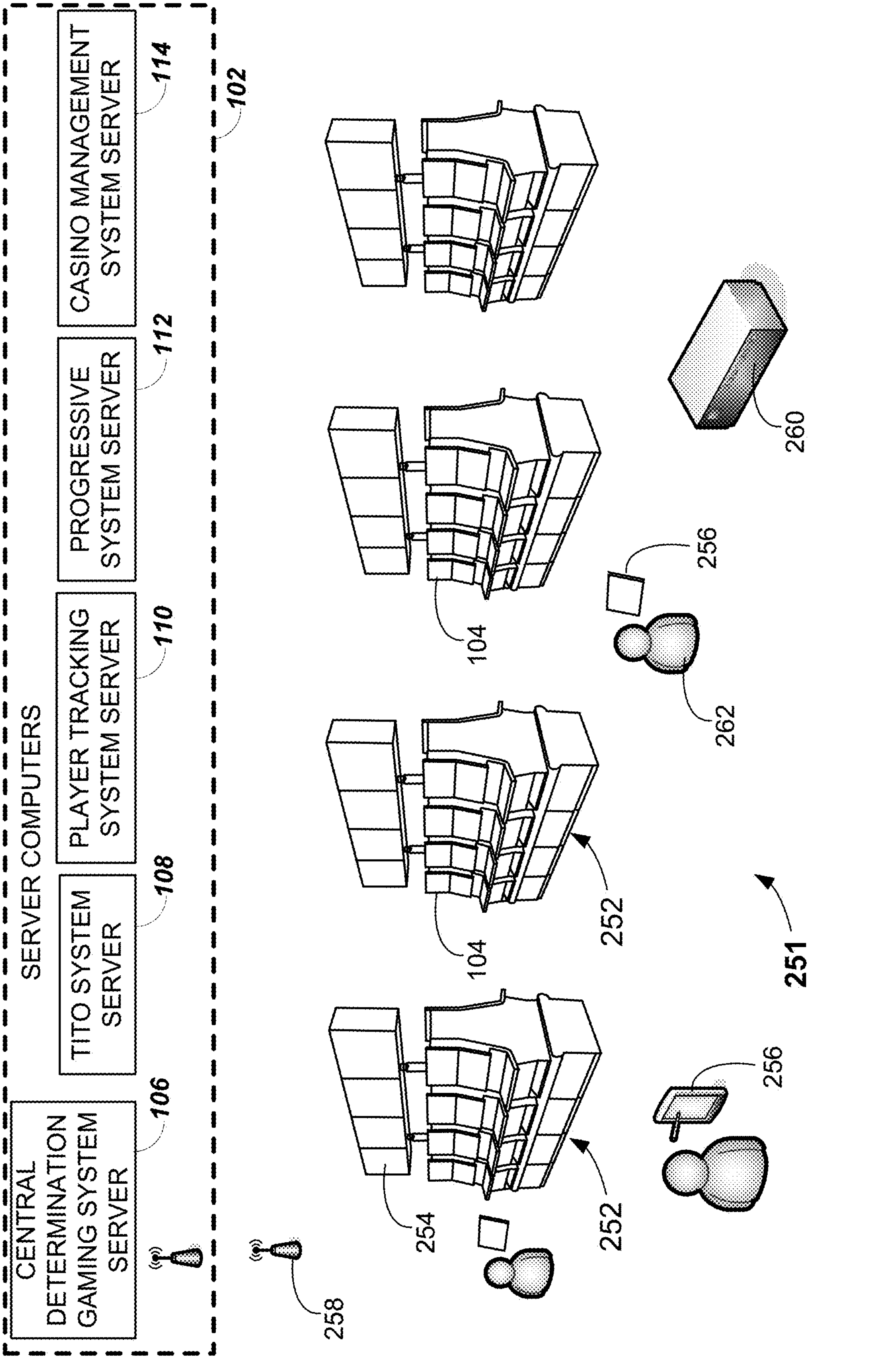
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
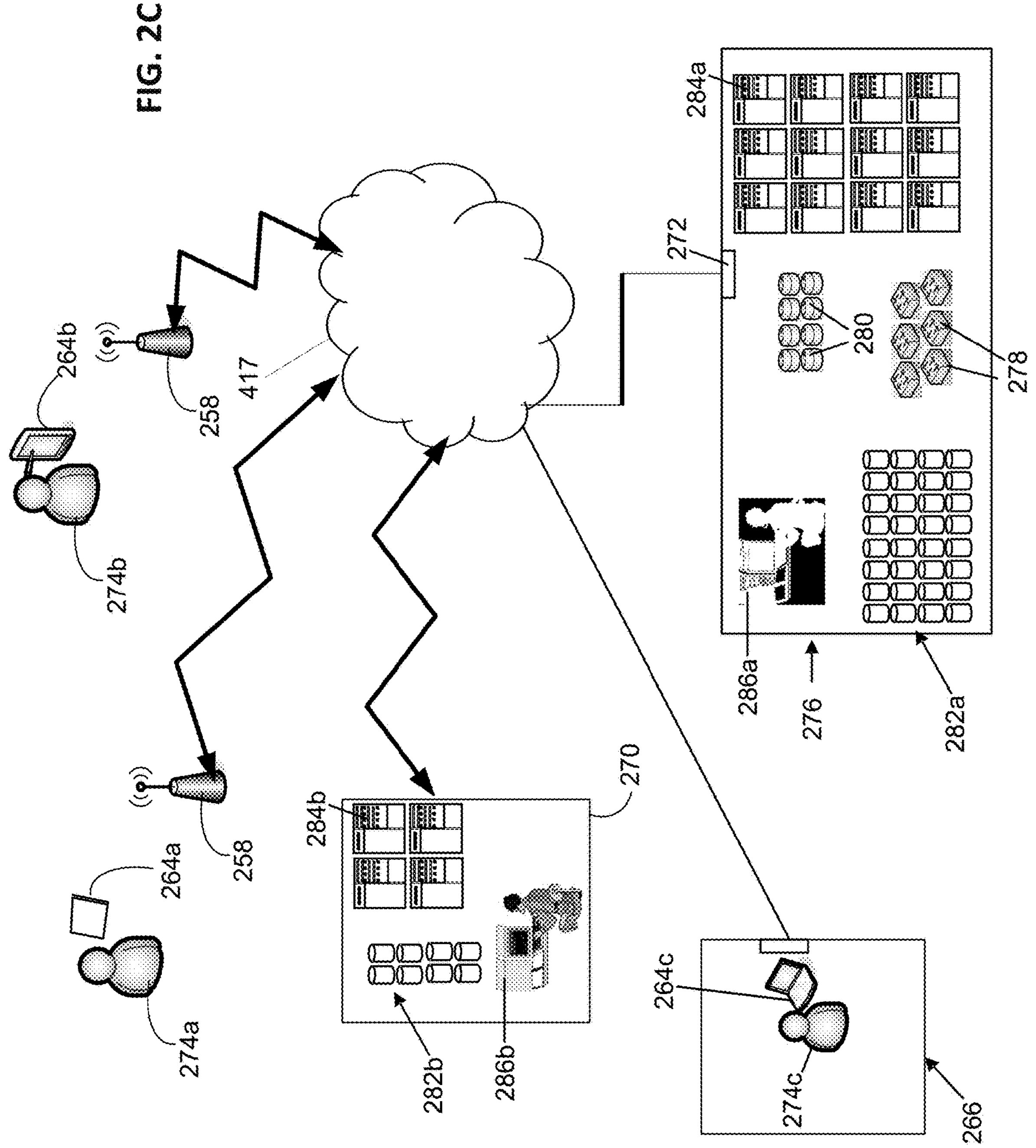
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
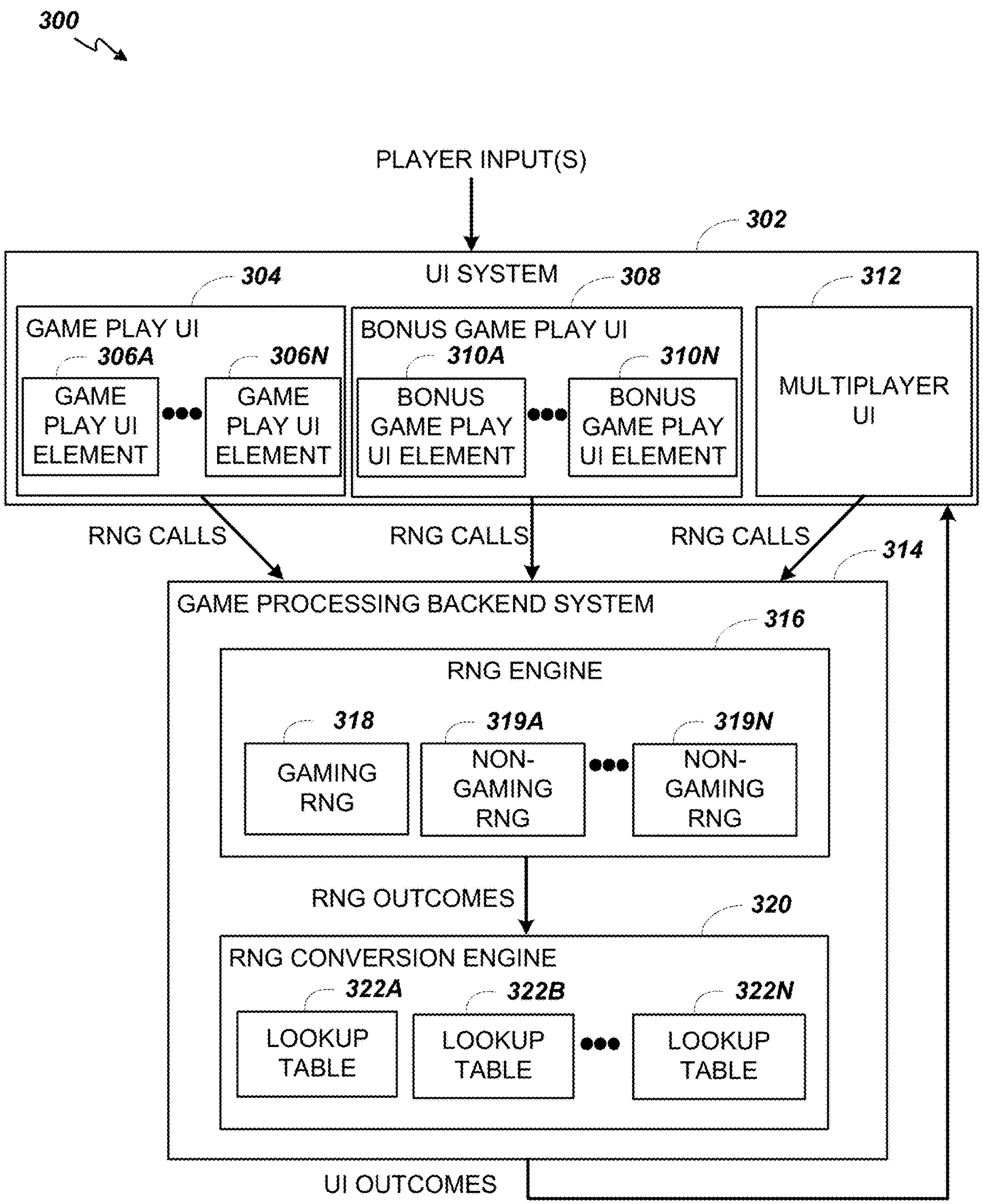
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, electronic gaming machines such as those discussed above may include one or more latch mechanisms such as the dual-latch mechanisms discussed herein. FIG. 4 depicts a perspective view of an example dual-latch mechanism which will be used for reference in the following discussion. It will, however, be appreciated that the example dual-latch mechanism of FIG. 4 is but one example of such a device, and that other implementations embodying the concepts discussed herein are to be understood to also be within the scope of this disclosure.

Figure 4:
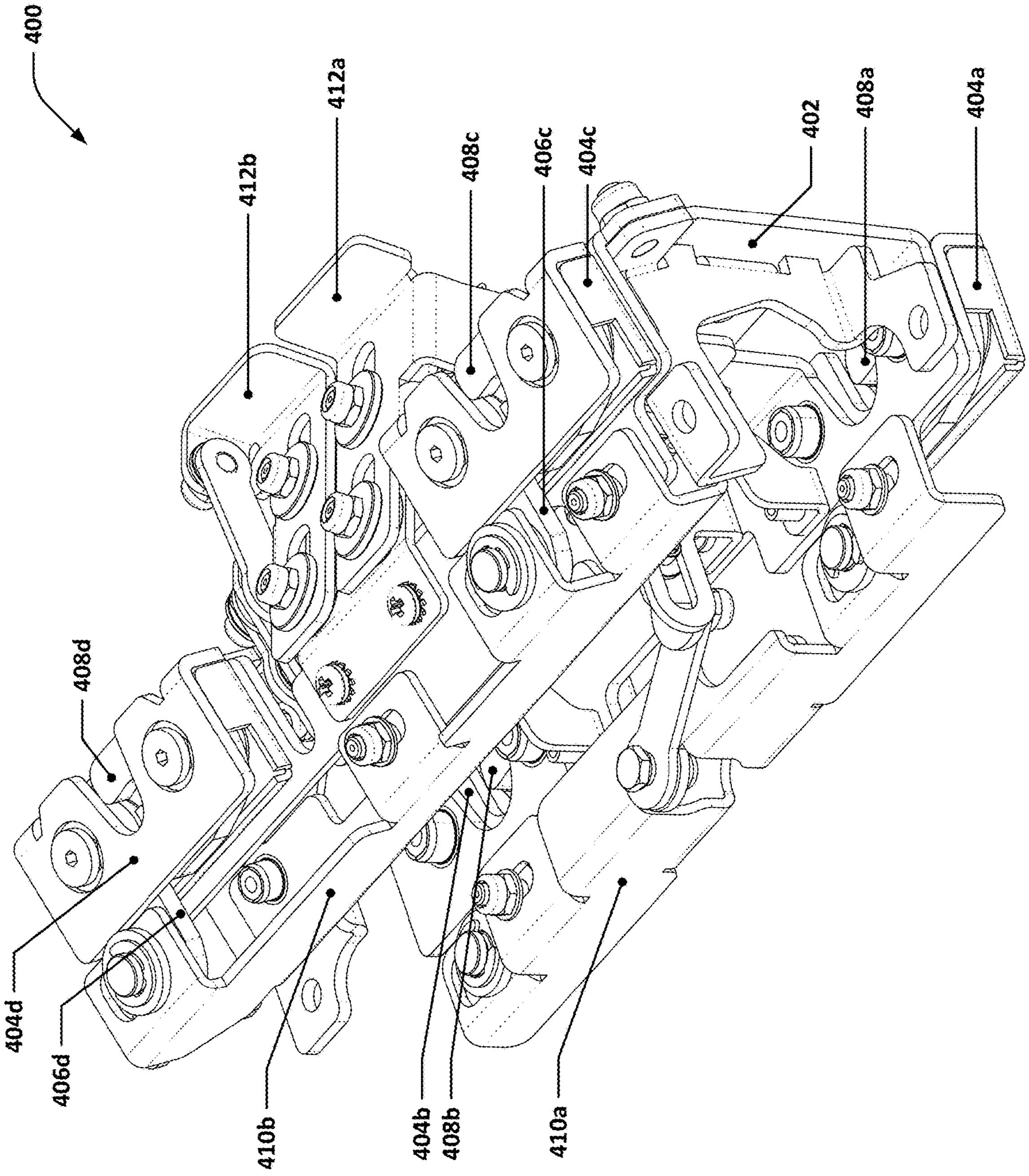
FIG. 4 depicts a perspective view of an example dual-latch mechanism.

In FIG. 4, a dual-latch mechanism 400 is shown. The dual-latch mechanism 400 includes a support bracket 402 that may serve as a rigid support framework that may support the various movable elements of the dual-latch mechanism 400 in space and which may also provide one or more attachment points that allow the dual-latch mechanism 400 to be secured or mounted to, for example, a gaming machine cabinet or other device having doors or trays that may require securement.

The support bracket 402 may be a single-piece design or may, as shown here, be a multi-piece design in which the various separate pieces are bolted, welded, or otherwise joined together to form a generally rigid structure.

The dual-latch mechanism 400 of FIG. 4 actually incorporates two separate dual-latch systems that may be independently or simultaneously operated. It will be understood that other implementations may feature only one such dual-latch system.

As can be seen in FIG. 4, the dual-latch mechanism 400 includes a plurality of rotary latches 404, e.g., 404*a*, 404*b*, 404*c*, and 404*d*. The rotary latches 404*a* and 404*b* are part of one of the two dual-latch systems, while the rotary latches 404*c* and 404*d* are part of the other of the two dual-latch systems. Each of the rotary latches 404*a*, 404*b*, 404*c*, and 404*d* may be mounted to the support bracket 402, e.g., bolted to the support bracket 402.

Figure 5:
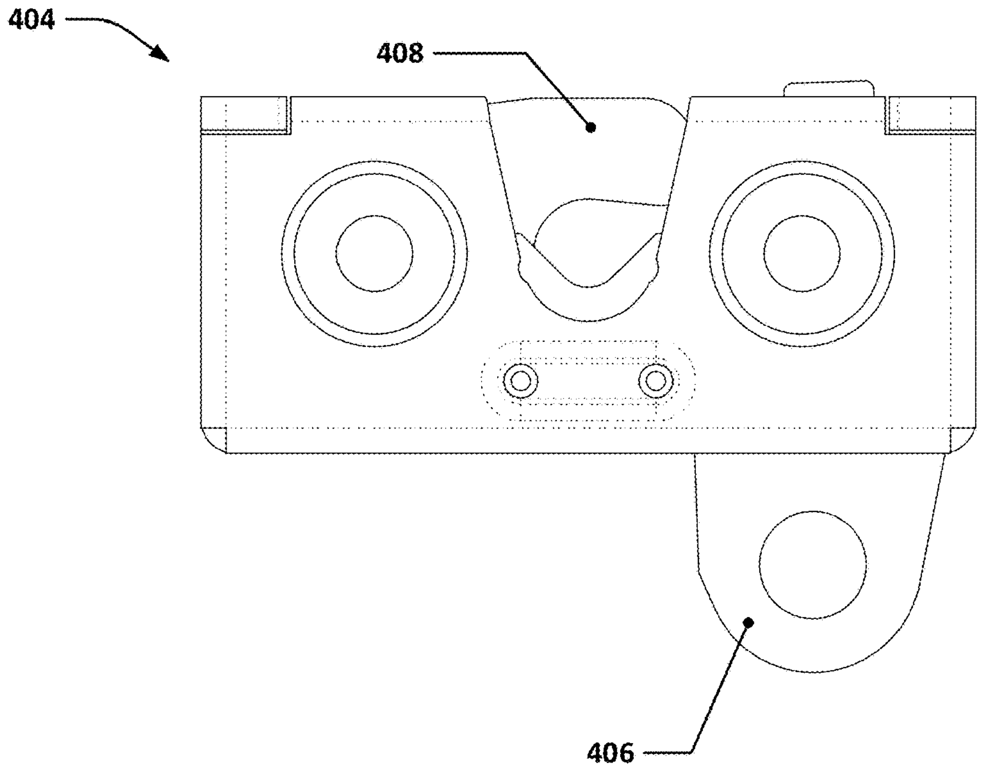
FIG. 5 depicts a rotary latch in a latched configuration.
Figure 6:
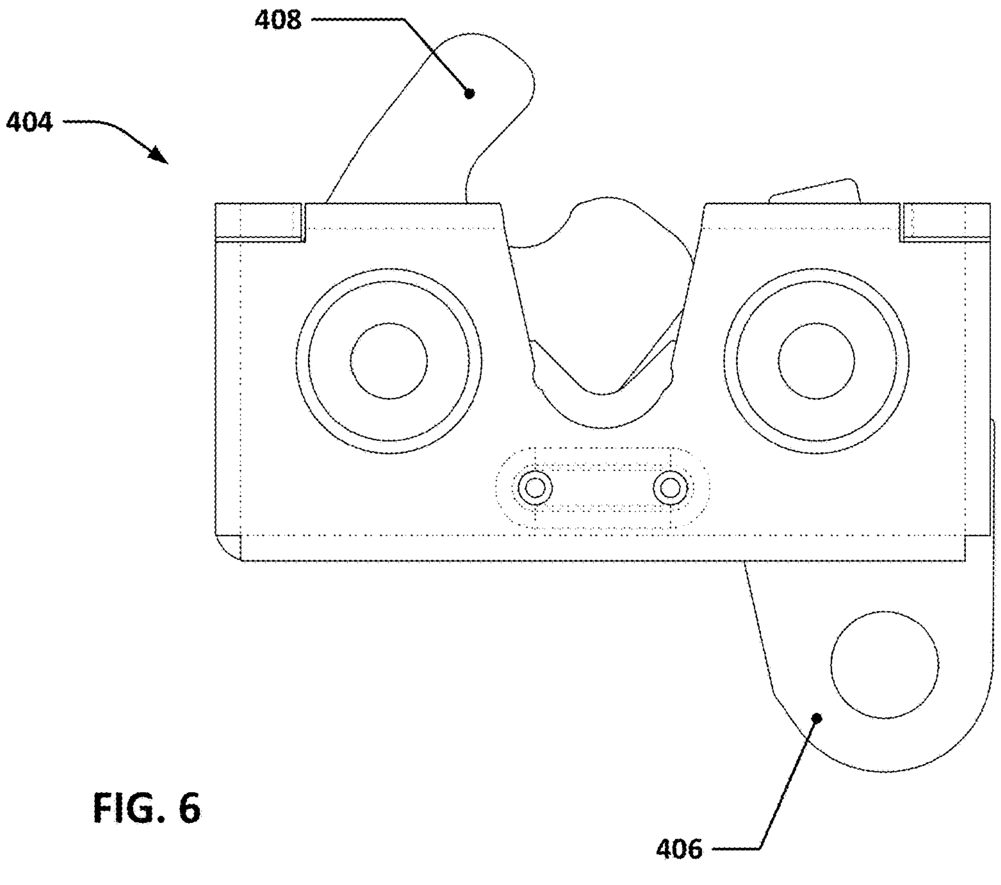
FIG. 6 depicts the rotary latch of FIG. 5 in an unlatched configuration.

An example of a rotary latch 404 is shown in FIG. 5 in a latched state and in FIG. 6 in an unlatched state. The depicted rotary latch 404 is similar to a Southco rotary push-to-close latch, and includes a trigger 406 and a latching member 408 (some designs may feature multiple latching members—for example, the Soutcho R4-50-40-101-10 rotary latch features two latching members that move in concert when latching or unlatching). The latching member 408 is configured to be able to rotate or move between a latched position (as shown in FIG. 5) and an unlatched position (as shown in FIG. 6). In this example, the latching member 408 swings through an arc of approximately 60° when transitioning between the latched and unlatched positions.

The trigger 406 of the rotary latch 404 is configured to be rotatable or movable between an untriggered state (as shown in FIG. 5) and a triggered state (as shown in FIG. 6). When the latching member 408 is in the latched position and the trigger 406 is in the untriggered state, as shown in FIG. 5, the latching member 408 is prevented from moving to the unlatched position by the trigger 406. Stated another way, trigger 406 obstructs movement of the latching member 408 from the latched position to the unlatched position when the latching member 408 is in the latched position and the trigger 406 is in the untriggered state, and trigger 406 enables the movement of the latching member 408 from the latched position to the unlatched position when the latching member 408 is in the latched position and the trigger 406 is in the triggered state. The latching member 408 may, in some implementations, be sprung such that it is constantly being urged towards the unlatched position when in the latched position. In such implementations, moving the trigger 406 from the untriggered state to the triggered state allows the spring to push the latching member 408 from the latched position into the unlatched position, thereby causing the latching member 408 to snap outwards once the trigger 406 is moved from the untriggered state to the triggered state.

The details of such rotary latches 404, e.g., the internal mechanisms of such rotary latches 404, are not discussed here, as rotary latches 404 are commercially available. Moreover, other types of rotary latches 404 that use different internal mechanisms from those used in the rotary latches 404 mentioned above may be used as well, if desired.

Returning to FIG. 4, the triggers 406 for some of the rotary latches 404 can be seen, e.g., triggers 406*c* and 406*d*, as well as the latching members 408, e.g., the latching members 408*a*, 408*b*, 408*c*, and 408*d*.

It can also be seen that the dual-latch mechanism 400 further includes a first actuator 412*a* and a second actuator 412*b*, each of which may be movably mounted to the support bracket 402 such that the first actuator 412*a* is movable between a first actuation position relative to the support bracket 402 and a second actuation position relative to the support bracket 402 and such that the second actuator 412*b* is movable between a third actuation position relative to the support bracket 402 and a fourth actuation position relative to the support bracket 402.

The first actuator 412*a* may be kinematically linked, e.g., by one or more kinematic linkages, to a first common actuator bar 410*a* such that when the first actuator 412*a* is moved from the first actuation position to the second actuation position, the first common actuator bar 410*a* is caused to move along a corresponding axis and from a first position relative to the support bracket 402 to a second position relative to the support bracket 402 (or vice-versa). The axis, for example, may be along the long axis of the first common actuator bar 410*a*.

Similarly, the second actuator 412*b* may be kinematically linked, e.g., by one or more kinematic linkages, to a second common actuator bar 410*b* such that when the second actuator 412*b* is moved from the third actuation position to the fourth actuation position, the second common actuator bar 410*b* is caused to move along a corresponding axis and from a third position relative to the support bracket 402 to a fourth position relative to the support bracket 402. The corresponding axis, for example, may similarly be along the long axis of the second common actuator bar 410*b*.

FIGS. 7 through 10 depict the example dual-latch mechanism of FIG. 4 from a different perspective and in various states of operation. For example, in FIG. 7, the dual-latch mechanism 400 is shown in the same state as in FIG. 4, i.e., with the first actuator 412*a* and the second actuator 412*b* in the first actuation position and the third actuation positions, respectively, and the rotary latches 404*a*, 404*b*, 404*c*, and 404*d* with their latching members 408*a*, 408*b*, 408*c*, and 408*d* all in their respective latched positions. In this configuration, door(s) and/or slide-out tray(s) that have mating features, e.g., striker bolts or striker plates, that are captured by the latching members 408*a*, 408*b*, 408*c*, and 408*d* in the rotary latches 404*a*, 404*b*, 404*c*, and 404*d*, are secured firmly in place by the dual-latch mechanism 400.

Figure 7:
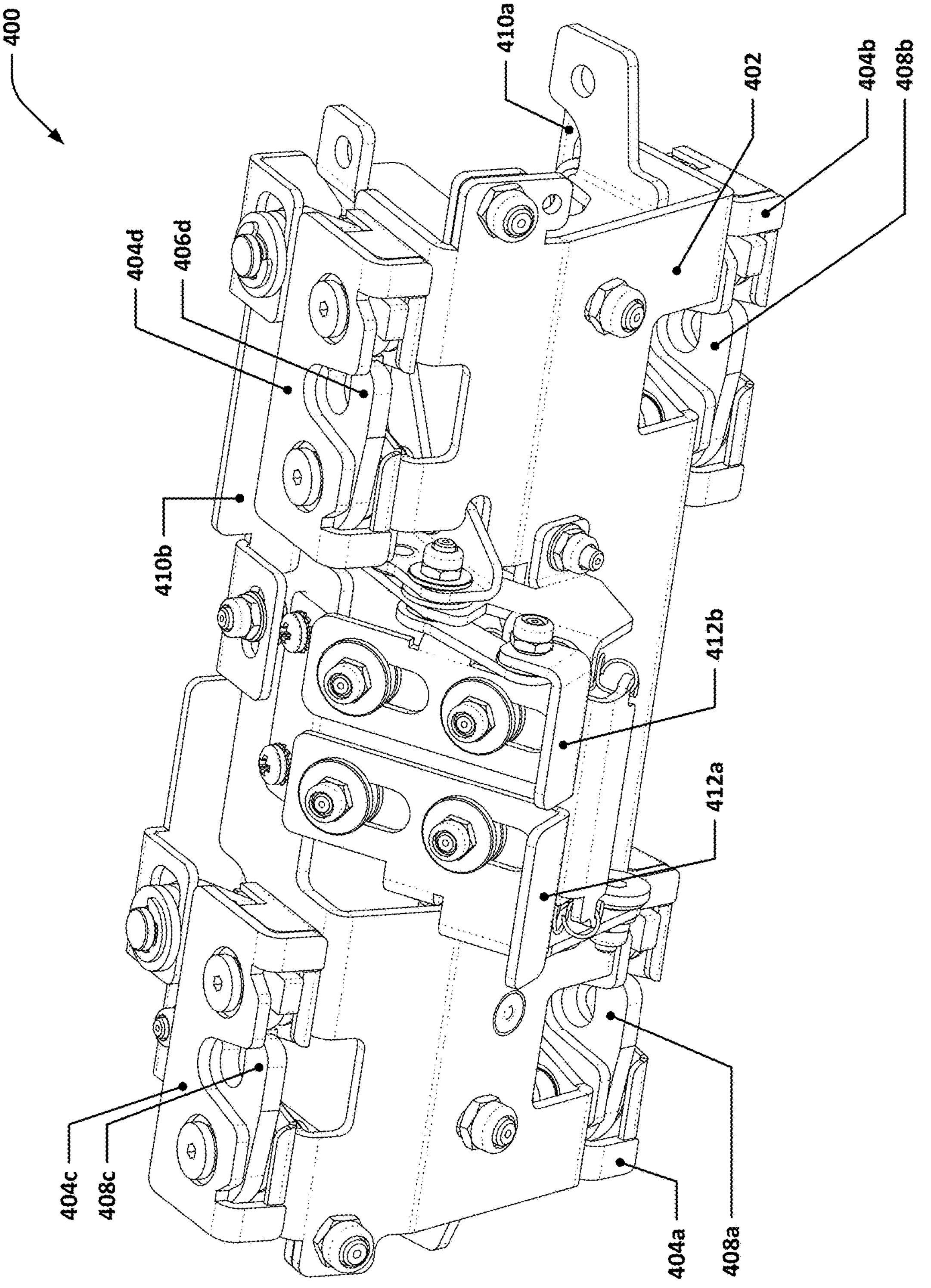
FIGS. 7 through 10 depict the example dual-latch mechanism of FIG. 4 from a different perspective and in various states of operation.
Figure 8:
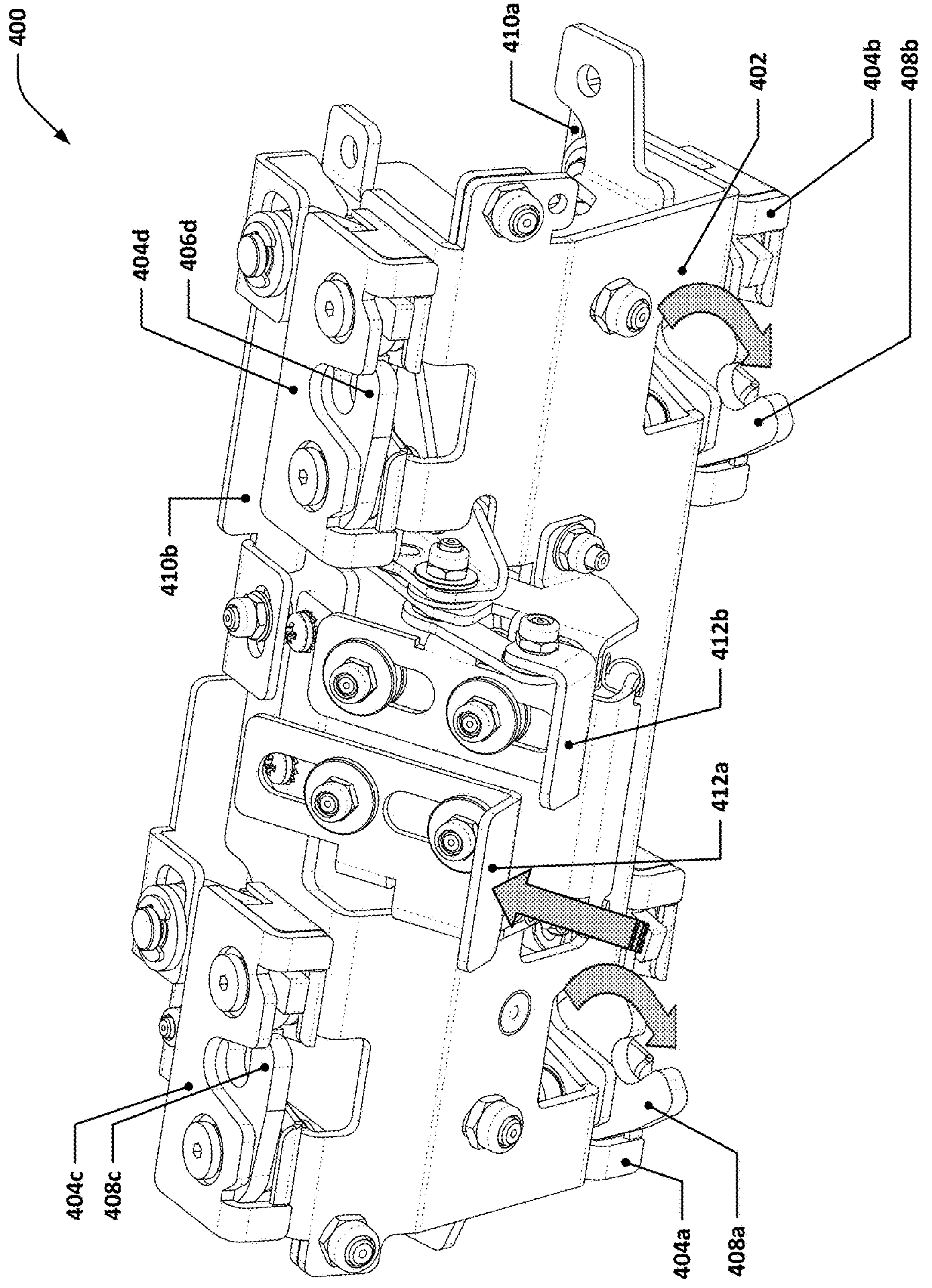

In FIG. 8, the first actuator 412*a* has been moved from the first actuation position relative to the support bracket 402 (as shown in FIG. 7) to a second actuation position relative to the support bracket 402. Such movement has also caused the first common actuator bar 410*a* to move (in this case, to the right of FIG. 8) from the first position relative to the support bracket 402 to the second position relative to the support bracket 402 so as to exert a lateral force on the triggers 406 of the first rotary latch 404*a* and the second rotary latch 404*b* that causes those triggers 406 to transition from the untriggered state to the triggered state. The movement of the triggers 406 of the first rotary latch 404*a* and the second rotary latch 404*b* into the triggered state has caused the latching members 408*a* and 408*b* to move from their respective latched positions to their respective unlatched positions.

Figure 9:
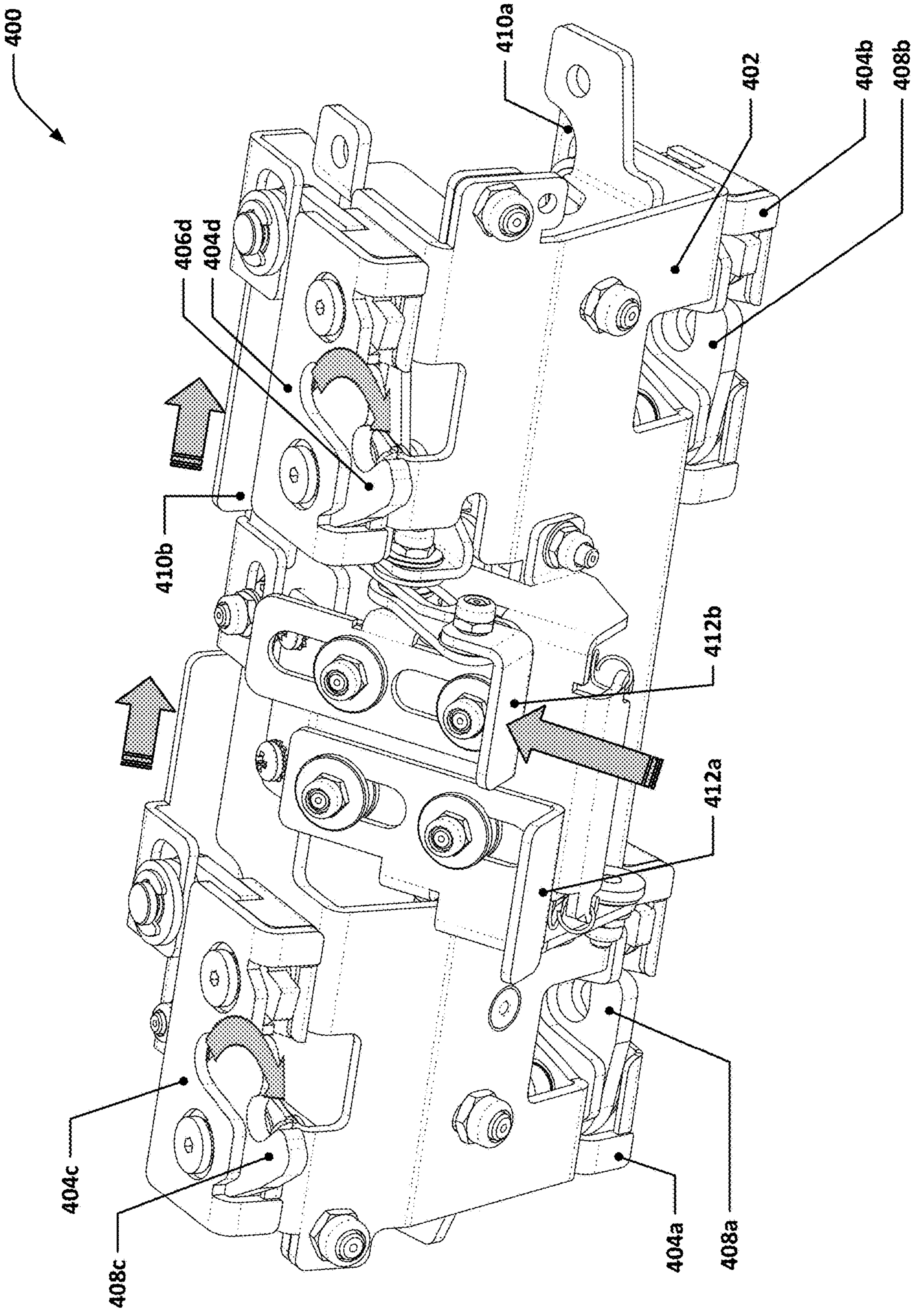

In FIG. 9, the second actuator 412*b* has been moved from the third actuation position relative to the support bracket 402 (as shown in FIG. 7) to a fourth actuation position relative to the support bracket 402. Such movement has also caused the second common actuator bar 410*b* to move (in this case, to the right of FIG. 9) so as to exert a lateral force on the triggers 406 of the third rotary latch 404*c* and the fourth rotary latch 404*d* that causes those triggers 406 to transition from the untriggered state to the triggered state. The movement of the triggers 406 of the third rotary latch 404*c* and the fourth rotary latch 404*d* into the triggered state has caused the latching members 408*c* and 408*d* to move from their respective latched positions to their respective unlatched positions.

Figure 10:
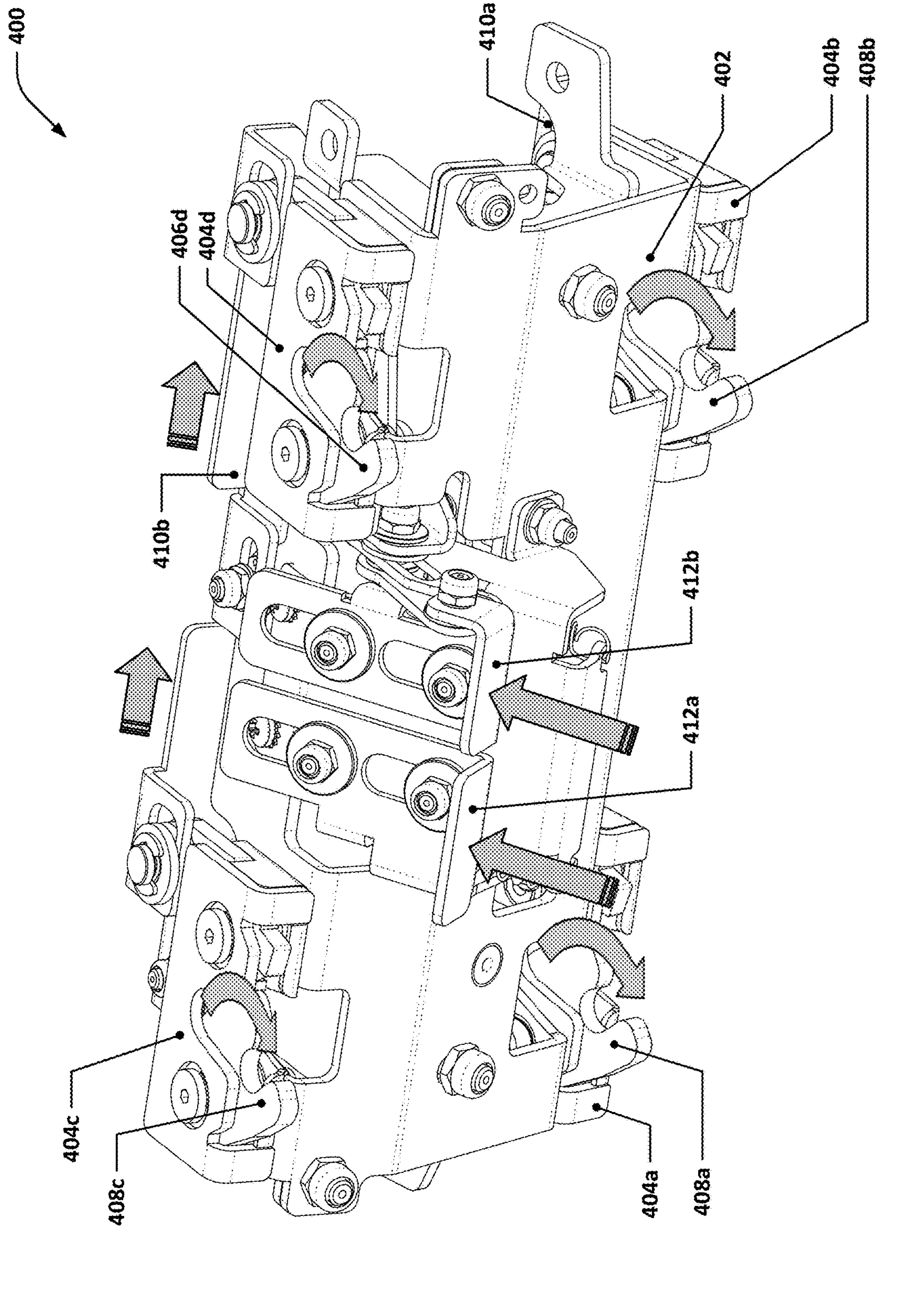

In FIG. 10, the first actuator 412*a* has been moved from the first actuation position to the second actuation position simultaneously with the second actuator 412*b* being moved from the third actuation position to the fourth actuation position. Thus, the first common actuator bar 410*a* and the second common actuator bar 410*b* are both caused to move from the first position and the third position relative to the support bracket 402, respectively, to the second position and the fourth position relative to the support bracket 402, respectively. Such movement of the first common actuator bar 410*a* and the second common actuator bar 410*b* causes the latching members 408*a*, 408*b*, 408*c*, and 408*d* of the rotary latches 404*a*, 404*b*, 404*c*, and 404*d* to all transition from their respective latched positions to their respective unlatched positions in a generally simultaneous manner.

Figure 11:
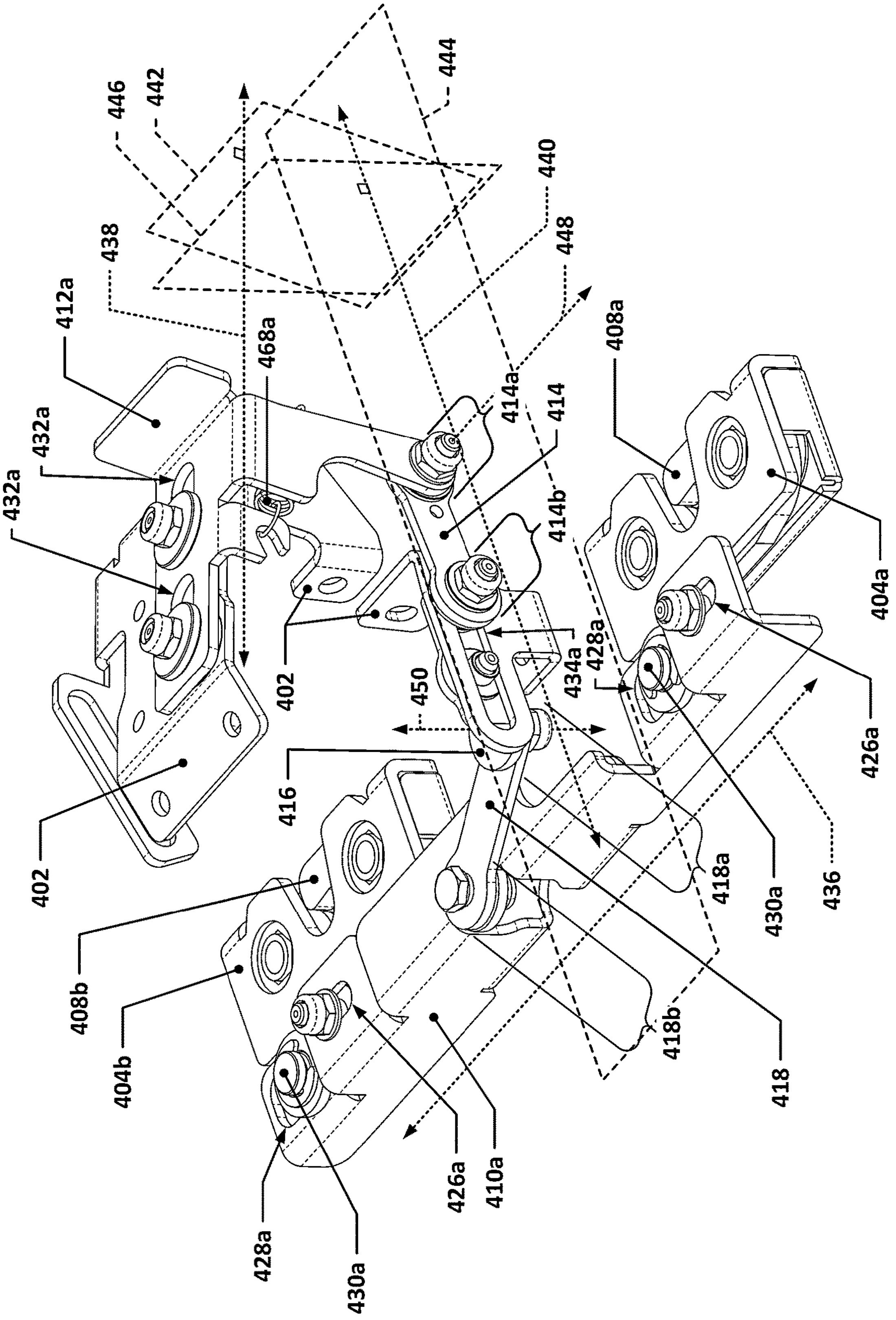
FIGS. 11 and 12 depict a sub-portion of the example dual-latch mechanism of FIG. 4 that includes a first set of latches.
Figure 12:
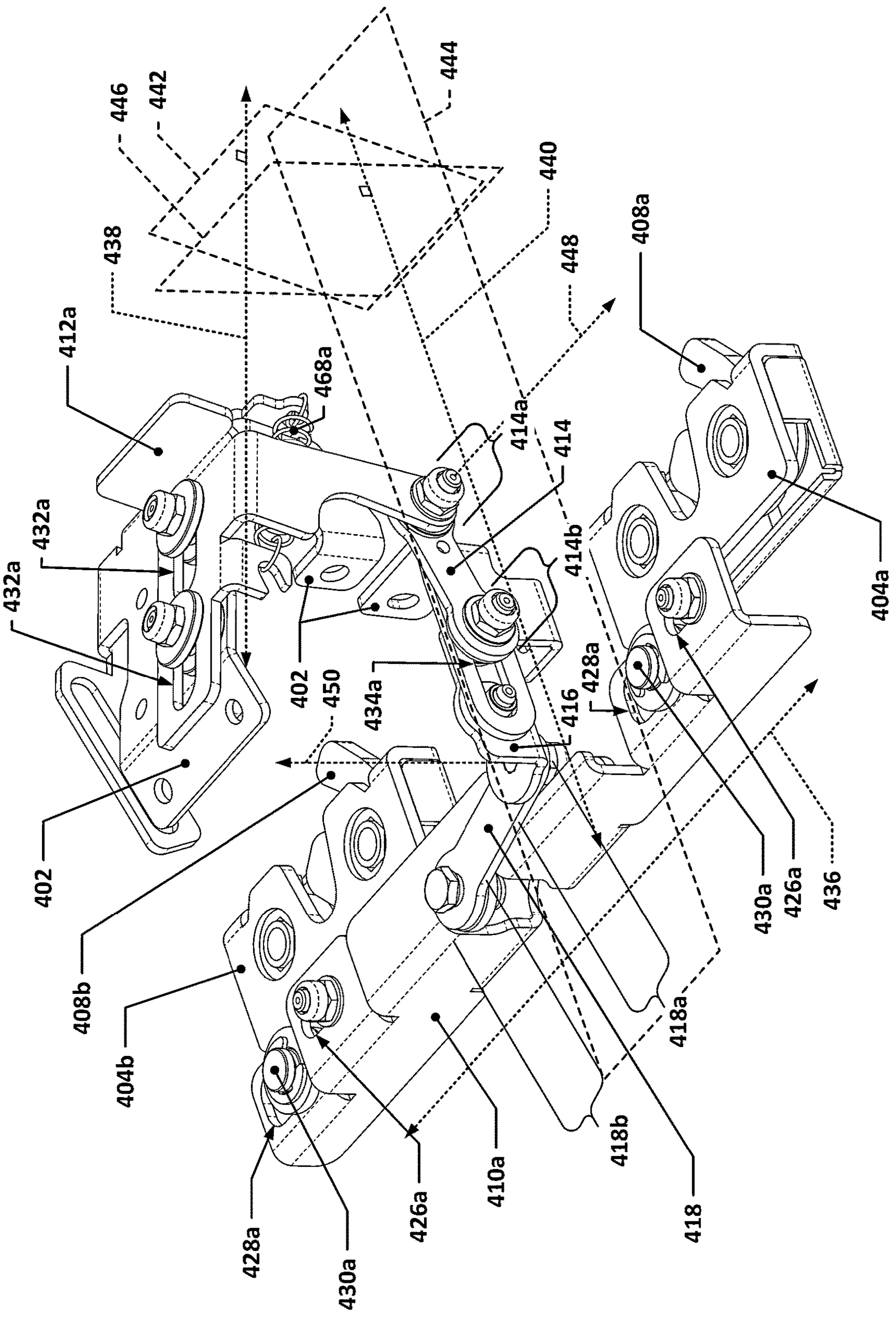
Figure 13:
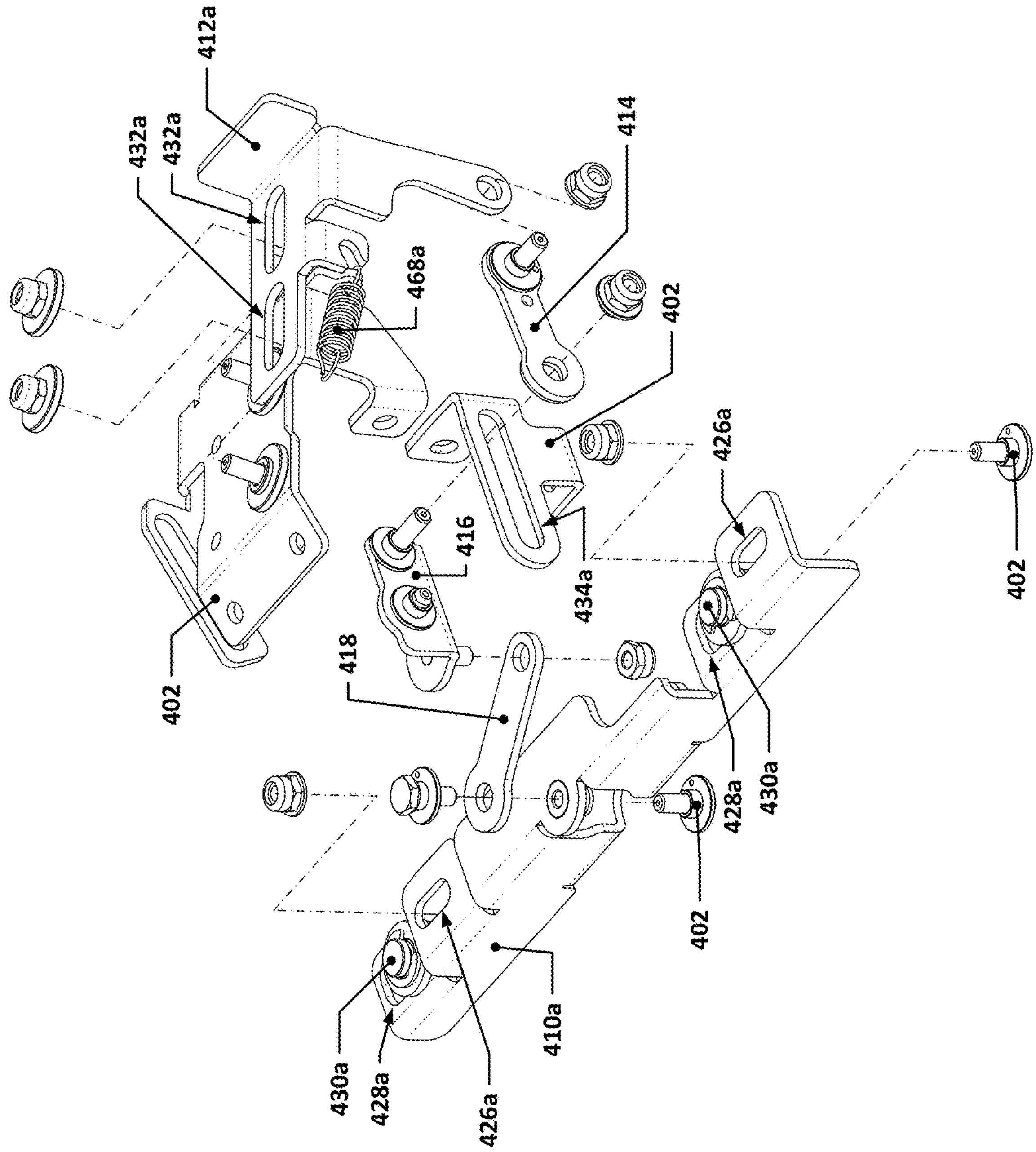
FIG. 13 depicts an exploded view of some of the elements shown in FIGS. 11 and 12.
Figure 14:
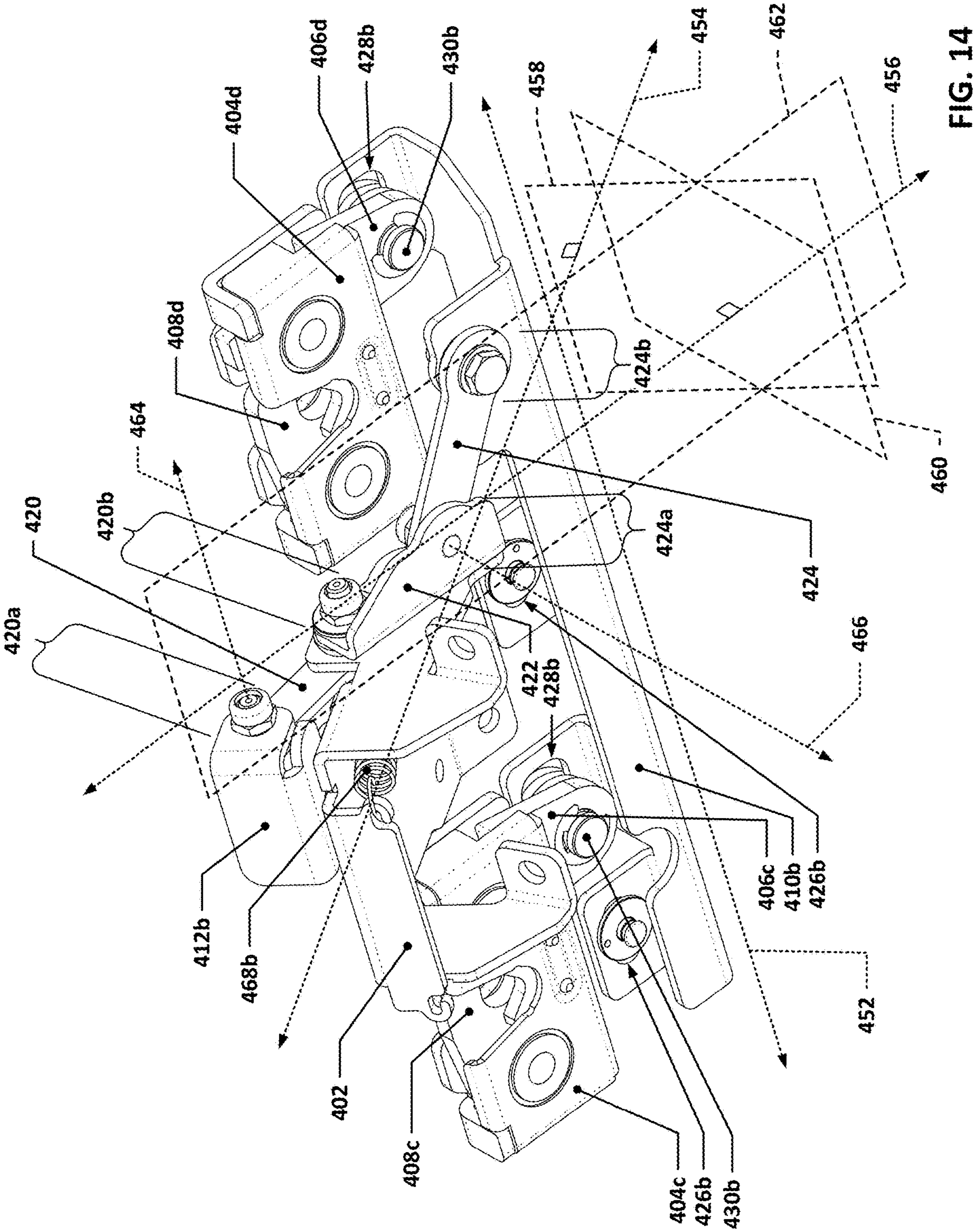
FIGS. 14 and 15 depict a sub-portion of the example dual-latch mechanism of FIG. 4 that includes a second set of latches.
Figure 15:
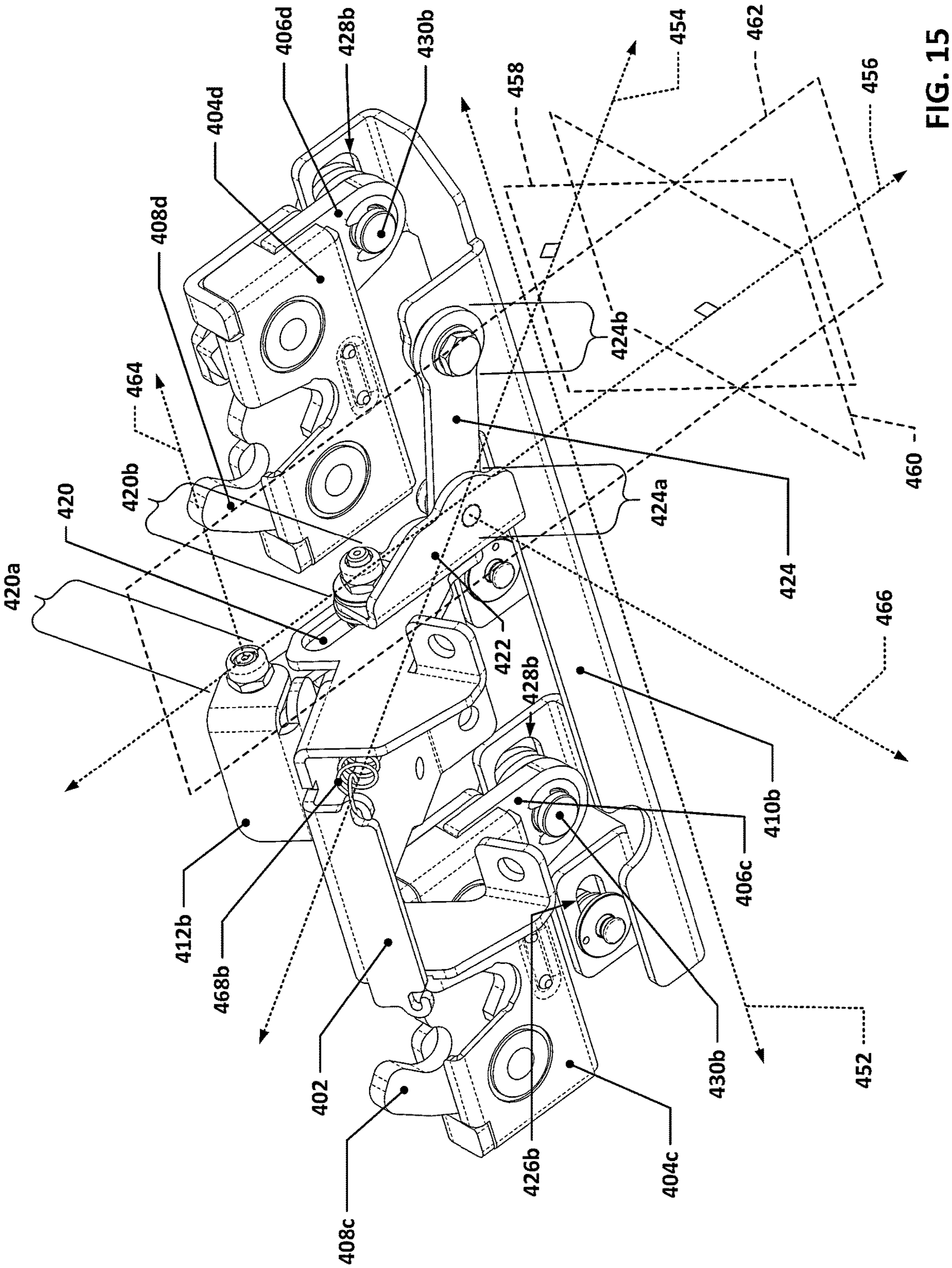
Figure 16:
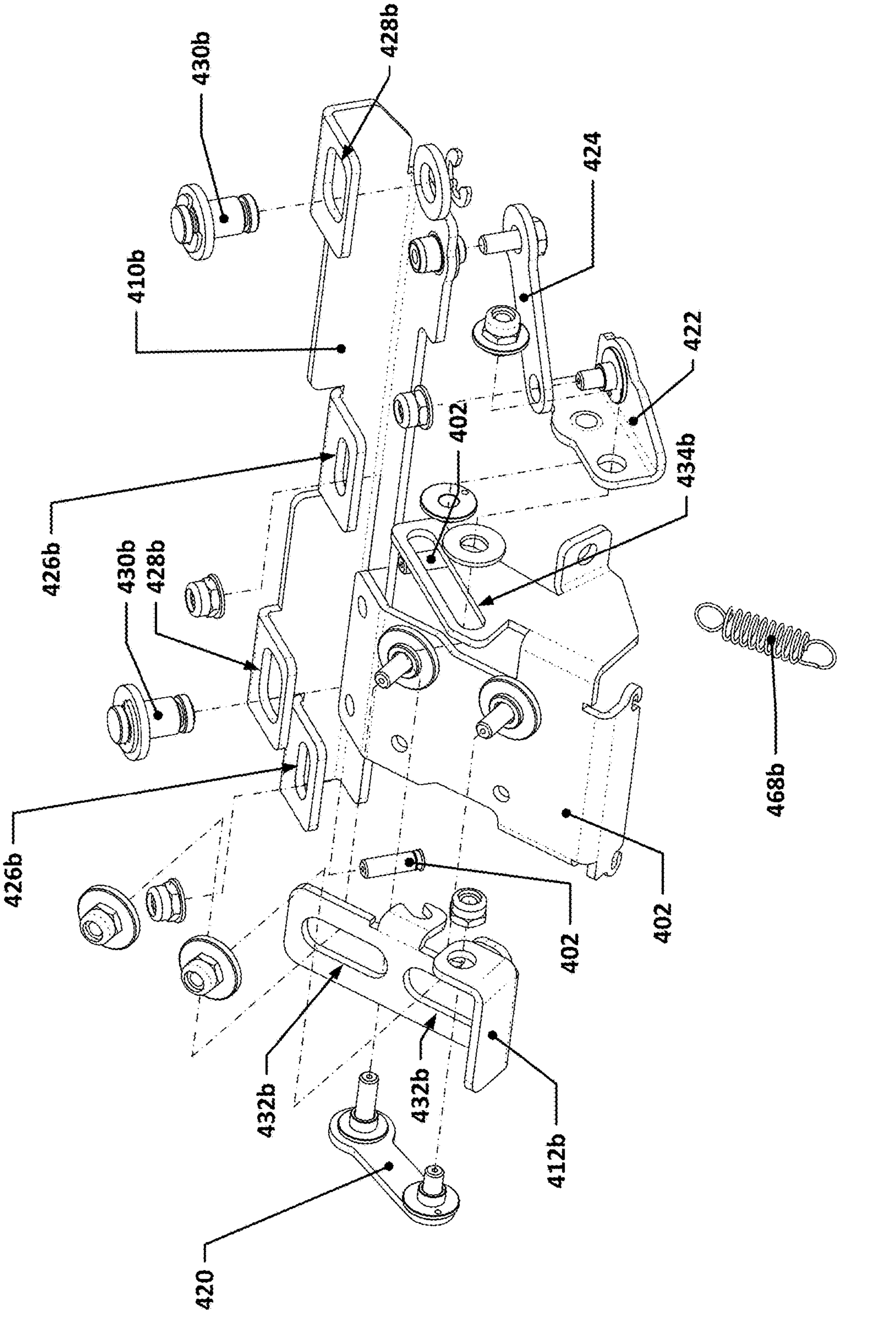
FIG. 16 depicts an exploded view of some of the elements shown in FIGS. 14 and 15.

The details of the kinematic linkages that permit the various types of latch actuation discussed above may take a variety of forms. In the particular implementation shown in FIGS. 4 through 10, however, the kinematic linkages that are used each include a pair of rotational links and corresponding sliding members. The kinematic linkage for the first dual-latch system is shown in FIGS. 11 and 12, while the kinematic linkage for the second dual-latch system is shown in FIGS. 14 and 15. FIG. 13 shows an exploded view of some of the components shown in FIGS. 11 and 12, while FIG. 16 shows an exploded view of some of the components shown in FIGS. 14 and 15.

FIG. 11 shows the kinematic linkage for the first dual-latch system with the first actuator 412*a* in the first actuation position and the first rotary latch 404*a* and the second rotary latch 404*b* with their respective latching members 408 in their corresponding latched positions, while FIG. 12 shows the kinematic linkage for the first dual-latch system with the first actuator 412*a* in the second actuation position and the first rotary latch 404*a* and the second rotary latch 404*b* with their respective latching members 408 in their corresponding unlatched positions. Similarly, FIG. 14 shows the kinematic linkage for the second dual-latch system with the second actuator 412*b* in the third actuation position and the third rotary latch 404*c* and the fourth rotary latch 404*d* with their respective latching members 408 in their corresponding latched positions, while FIG. 15 shows the kinematic linkage for the second dual-latch system with the third actuator 412*c* in the fourth actuation position and the third rotary latch 404*c* and the fourth rotary latch 404*d* with their respective latching members 408 in their corresponding unlatched positions.

In FIGS. 11 through 15, the majority of the support bracket 402 has been hidden from view, as have the components associated with the second dual-latch system. Similarly, in FIGS. 14 and 15, the majority of the support bracket 402 has been hidden from view, as well as the components associated with the first dual-latch system.

In FIGS. 11 and 12, the portions of the support bracket 402 that are shown provide mounting locations for the various movable elements of the kinematic linkage of the first dual-latch system. For example, the first common actuator bar 410*a* may be mounted to the support bracket 402 by way of threaded studs that extend up from the support bracket 402 and pass through obround first bar guide slots 426*a* in the first common actuator bar 410*a*. Nuts threaded onto the threaded studs may act to capture the first common actuator bar 410*a* but still allow the first common actuator bar 410*a* to be translatable or slidable along a first axis 436 relative to the support bracket 402, e.g., between the first position relative to the support bracket 402 and the second position relative to the support bracket 402. In FIGS. 11 and 12, the threaded studs and nuts are shown, but the portion of the support bracket that the threaded studs extend from is not shown.

Similarly, the portion of the support bracket 402 that is interfaced with the first actuator 412*a* has two bushings that are secured to the support bracket 402 by corresponding nuts that are threaded onto threaded studs that protrude from the support bracket 402. The two bushings are inserted through corresponding obround first actuator guide slots 432*a* on the first actuator 412*a* so that the first actuator 412*a* is captured by the bushings but is able to slide along a second axis 438 relative to the support bracket 402.

As can be seen, a first spring 468*a* is stretched between the first actuator 412*a* and the support bracket 402; the first spring 468*a* may be arranged to pull the first actuator 412*a* into the first actuation position.

The first actuator 412*a* has a tab at one end that is generally perpendicular to the second axis 438 and may be used as a surface against which a motive force may be applied in order to push the first actuator 412*a* from the first actuation position to the second actuation position. The first actuator 412*a* may also have an arm or tab that extends at a right angle from the portion of the first actuator 412*a* that has the first actuator guide slots 432*a*. A first driving link 414 may have a first end 414*a* that is rotatably connected with the first actuator 412*a*, e.g., at the end of the arm or tab mentioned above, and a second end 414*b* that is rotatably connected with a first sliding member 416. The first sliding member 416 may, for example, be slidably engaged with an obround first slide guide slot 434*a* in the support bracket 402 and secured to the support bracket 402 such that the first sliding member 416 is able to translate or slide along a third axis 440.

The first driving link 414 may, when the first actuator 412*a* is moved along the second axis 438, translate that translational motion into translational movement of the first sliding member 416 along the third axis 440. In doing so, the first driving link 414 may rotate relative to the first actuator 412*a* and about a first rotational axis 448 that is parallel to the first axis 436.

The kinematic linkage of the first dual-latch system may also include a first driven link 418 that has a first end 418*a* that is rotatably connected with the first sliding member 416 and a second end 418*b* that is rotatably connected with the first common actuator bar 410*a*. The first driven link 418 may have a long axis that is at an oblique angle relative to the third axis 440, thereby allowing sliding motion of the first sliding member 416 along the third axis 440 to be translated into motion of the second end 418*b* of the first driven link 418, and thus the first common actuator bar 410*a*, along the first axis 436. In doing so, the first driven link 418 may rotate relative to the first sliding member 416 and about a second rotational axis 450 that is parallel to a plane that is parallel to the first axis 436 and perpendicular to another plane that is parallel to both the first axis 436 and the third axis 440.

The first common actuator bar 410*a* may also have first trigger slots 428*a* that may engage with first trigger pins 430*a* that are part of the triggers 406 of the first rotary latch 404*a* and the second rotary latch 404*b*. The first trigger slots 428*a* may be sized such when the first common actuator bar 410*a* is moved to the first position, the first trigger pins 430*a* may come into contact with the sides of the first trigger slots 428*a* for at least some of the travel of the first common actuator bar 410*a* and thus be moved from the untriggered state to the triggered state, thereby causing the latching members 408 of the first rotary latch 404*a* and the second rotary latch 404*b* to move from their respective latched positions to their respective unlatched positions.

It will be appreciated that in other implementations, the first actuator 412*a* may, instead of sliding relative to the support bracket 402, be rotatably mounted to the support bracket 402 such that it can pivot or rotate relative to the support bracket 402, e.g., about an axis parallel to the first rotational axis 448, thereby producing a swinging motion in the end of the first actuator 412*a* that may drive the first driving link 414 in a similar manner.

It can be seen that the second axis 438 may be perpendicular to a first reference plane 442 that is parallel to the first axis 436 and the third axis 440 may be perpendicular to a second reference plane 444 that is also parallel to the first axis 436. In the depicted example, the second axis 438 is at an oblique angle to the second reference plane 446, thereby allowing the first actuator 412*a* to slide along a direction that is not aligned with the third axis 440 and parallel to a plane that is not skewed with respect to the mounting plane of the first rotary latch 404*a* and the second rotary latch 404*b*.

FIG. 13 depicts an exploded view of some of the components shown in FIGS. 11 and 12, although the first rotary latch 404*a* and the second rotary latch 404*b* are both omitted from this view to avoid obscuring other features. The various elements shown have been previously discussed and the earlier discussion of such elements may be referred to for the purposes of reviewing FIG. 13.

The second dual-latch system operates in a similar manner to the first dual-latch mechanism, although the specific components have somewhat different shapes. The operating principles between the two dual-latch systems are similar, however.

In FIGS. 14 and 15, the portions of the support bracket 402 that are shown provide mounting locations for the various movable elements of the kinematic linkage of the second dual-latch system. For example, the second common actuator bar 410*b* may be mounted to the support bracket 402 by way of pins that extend up from the support bracket 402 and pass through obround second bar guide slots 426*b* in the second common actuator bar 410*b*. Snap rings snapped onto the pins may act to capture the second common actuator bar 410*b* but still allow the second common actuator bar 410*b* to be translatable or slidable along a fourth axis 452 relative to the support bracket 402, e.g., between the third position relative to the support bracket 402 and the fourth position relative to the support bracket 402. In FIGS. 14 and 15, the pins and snap rings are shown, but the portion of the support bracket that the pins extend from is not shown.

Similarly, the portion of the support bracket 402 that is interfaced with the second actuator 412*b* has two bushings that are secured to the support bracket 402 by corresponding nuts that are threaded onto threaded studs that protrude from the support bracket 402. The two bushings are inserted through corresponding obround second actuator guide slots 432*b* on the second actuator 412*b* so that the second actuator 412*b* is captured by the bushings but is able to slide along a fifth axis 454 relative to the support bracket 402.

As can be seen, a second spring 468*b* is stretched between the second actuator 412*b* and the support bracket 402; the second spring 468*b* may be arranged to pull the second actuator 412*b* into the third actuation position.

The second actuator 412*b* has a tab at one end that is generally perpendicular to the fifth axis 454 and may be used as a surface against which a motive force may be applied in order to push the second actuator 412*b* from the third actuation position to the fourth actuation position. A second driving link 420 may have a first end 420*a* that is rotatably connected with the second actuator 412*b*, e.g., to a short secondary tab that extends at a right angle from the tab discussed above, and a second end 420*b* that is rotatably connected with a second sliding member 422. The second sliding member 422 may, for example, be slidably engaged with an obround second slide guide slot 434*b* in the support bracket 402 and secured to the support bracket 402 such that the second sliding member 422 is able to translate or slide along a sixth axis 456.

The second driving link 420 may, when the second actuator 412*b* is moved along the fifth axis 454, translate that translational motion into translational movement of the second sliding member 422 along the sixth axis 456. In doing so, the second driving link 420 may rotate relative to the second actuator 412*b* and about a third rotational axis 464 that is parallel to the fourth axis 452.

The kinematic linkage of the second dual-latch system may also include a second driven link 424 that has a first end 424*a* that is rotatably connected with the second sliding member 422 and a second end 424*b* that is rotatably connected with the second common actuator bar 410*b*. The second driven link 424 may have a long axis that is at an oblique angle relative to the sixth axis 456, thereby allowing sliding motion of the second sliding member 422 along the sixth axis 456 to be translated into motion of the second end 424*b* of the second driven link 424, and thus the second common actuator bar 410*b*, along the fourth axis 452. In doing so, the second driven link 424 may rotate relative to the second sliding member 422 and about a third rotational axis 464 that is parallel to a plane that is parallel to the fourth axis 452 and perpendicular to another plane that is parallel to both the fourth axis 452 and the sixth axis 456.

The second common actuator bar 410*b* may also have second trigger slots 428*b* that may engage with second trigger pins 430*b* that are part of the triggers 406 of the third rotary latch 404*c* and the fourth rotary latch 404*d*. The second trigger slots 428*b* may be sized such when the second common actuator bar 410*b* is moved to the third position, the second trigger pins 430*b* may come into contact with the sides of the second trigger slots 428*b* for at least some of the travel of the second common actuator bar 410*b* and thus be moved from the untriggered state to the triggered state, thereby causing the latching members 408 of the third rotary latch 404*c* and the fourth rotary latch 404*d* to move from their respective latched positions to their respective unlatched positions.

It will be appreciated that in other implementations, the second actuator 412*b* may, instead of sliding relative to the support bracket 402, be rotatably mounted to the support bracket 402 such that it can pivot or rotate relative to the support bracket 402, e.g., about an axis parallel to the third rotational axis 464, thereby producing a swinging motion in the second actuator 412*b* that may drive the second driving link 420 in a similar manner.

It can be seen that the fifth axis 454 may be perpendicular to a fourth reference plane 458 that is parallel to the fourth axis 452 and the sixth axis 456 may be perpendicular to a fifth reference plane 460 that is also parallel to the fourth axis 452. In the depicted example, the fifth axis 454 is at an oblique angle to the fifth reference plane 4460, thereby allowing the second actuator 412*b* to slide along a direction that is not aligned with the sixth axis 456 and parallel to a plane that is not skewed with respect to the mounting plane of the third rotary latch 404*c* and the fourth rotary latch 404*d*.

FIG. 16 depicts an exploded view of some of the components shown in FIGS. 14 and 15, although the third rotary latch 404*c* and the fourth rotary latch 404*d* are both omitted from this view to avoid obscuring other features. The various elements shown have been previously discussed and the earlier discussion of such elements may be referred to for the purposes of reviewing FIG. 16.

Figure 17:
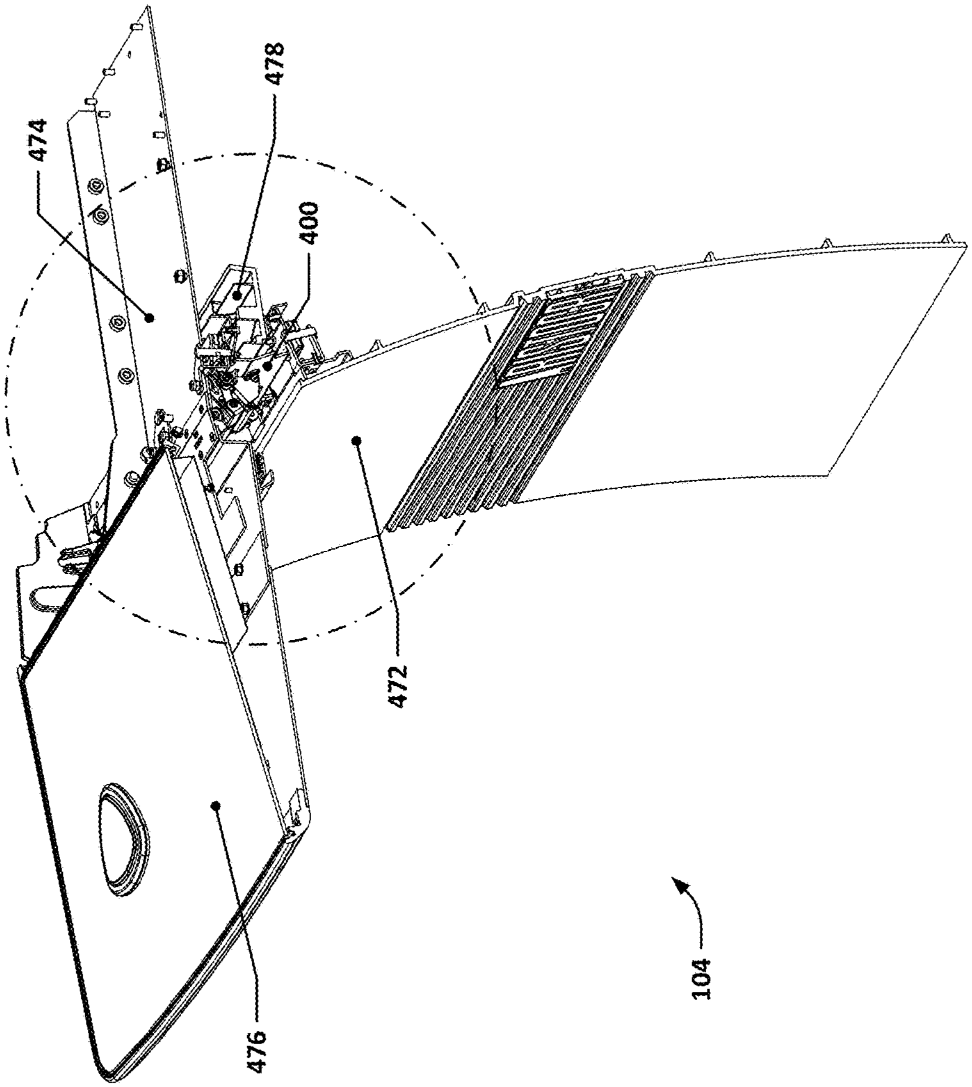
FIG. 17 depicts a perspective cutaway view of a portion of an electronic gaming machine cabinet incorporating a dual-latch mechanism.
Figure 18:
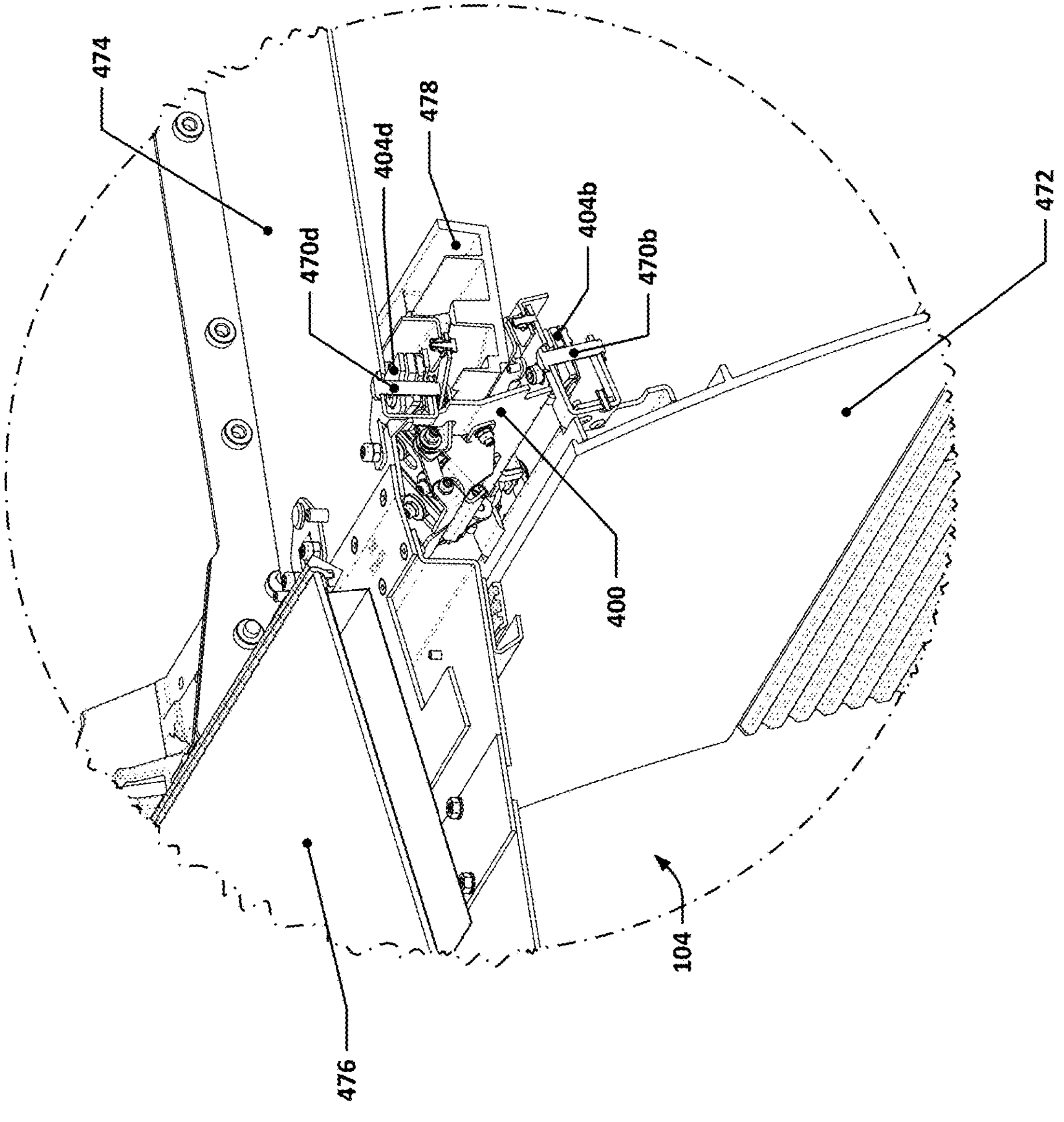
FIG. 18 depicts a detail view of the circled area in FIG. 17.
Figure 19:
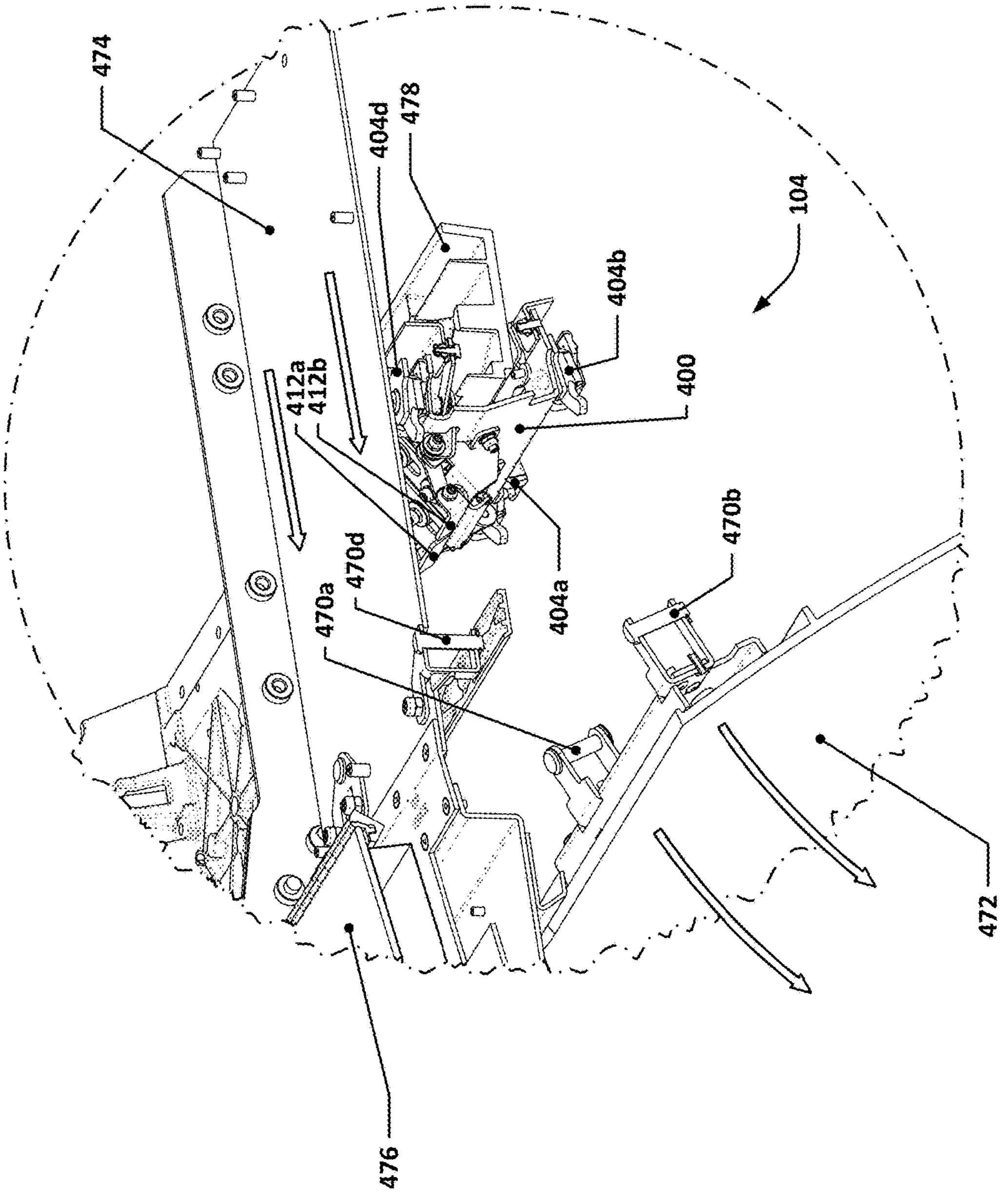
FIG. 19 depicts the detail view of FIG. 18, but with a door of the electronic gaming machine partially open and a tray of the electronic gaming machine slid partially out.

As noted earlier, the dual-latch mechanisms discussed herein may be used, for example, in electronic gaming machines in order to secure doors and/or sliding trays in place. Such doors and sliding trays may, for example, be movable to allow access to the interior of the electronic gaming machine. FIGS. 17 through 19 depict an implementation in which a dual-latch mechanism is installed in an electronic gaming machine 104. FIG. 17 depicts a perspective cutaway view of a portion of a cabinet of the electronic gaming machine 104 incorporating the dual-latch mechanism. Visible in FIG. 17 is a button deck 476 that is connected with a cabinet frame 478 of the cabinet of the electronic gaming machine 104 via a sliding tray 474. The button deck 476 may be slid in and out, more or less horizontally, between an extended position and a retracted position relative to the cabinet of the electronic gaming machine 104 using the sliding tray 474. Also visible in FIG. 17 is a door 472 that may be pivoted about a hinge in order to move the door 472 between an open configuration and a closed configuration. The electronic gaming machine 104 may also include a dual-latch mechanism 400, such as those discussed above, that is secured to the cabinet frame 478 and that may act to secure the door 472 and the sliding tray 474 in place relative to the cabinet frame 478.

FIG. 18 depicts a detail view of the circled area in FIG. 17. As can be seen, the cutting plane used in the cutaway view of FIG. 17 passes through the rotary latches 404*b* and 404*d*. Also visible in FIG. 18 are a second latch strike 470*b* and a fourth latch strike 470*d* (a first latch strike and a third latch strike are also included, but not visible in FIG. 18), which may, for example, be steel posts or other features that are able to engage with the latching members of the rotary latches 404*b* and 404*d* when the latch members of the rotary latches 404*b* and 404*d* are in the unlatched position. The first through fourth latch strikes 470 may, when pushed into the latching members of the rotary latches 404, cause the latching members of the rotary latches 404 to transition to their respective latched positions, thereby capturing the first through fourth latch strikes 470 within the rotary latches 404, as shown in FIG. 18.

The dual-latch mechanism 400 is, in FIGS. 17 through 19, shown as being accessible from the exterior of the electronic gaming machine 104, although in actual practice, a security cover or other mechanism may be used to cover the dual-latch mechanism 400 and prevent unauthorized access to, and operation of, the dual-latch mechanism 400.

The support bracket of the dual-latch mechanism 400 may be positioned within the gaming machine cabinet such that, when the door is in the closed configuration and the sliding tray is in the retracted position, the first through fourth latch strikes engage with, and are secured by, the first through fourth rotary latches 404.

FIG. 19 depicts the detail view of FIG. 18, but with the door 472 of the electronic gaming machine 104 partially open and the sliding tray 474 of the electronic gaming machine 104 partially slid out. As can be seen, the latching members of the rotary latches 404 are in their respective unlatched positions, having been released through movement of the first actuator 412*a* between the first actuation position and the second actuation position and movement of the second actuator 412*b* between the third actuation position and the fourth actuation position.

As can be seen, a dual-latch mechanism such as the dual-latch mechanism 400 may allow for rotary latches to be used that are positioned such that their latching members rotate about rotational axes that are, for example, misaligned with respect to the plane of motion of the first and second actuators. For example, in the depicted implementation, the rotational axes of the latching members of the various rotary latches shown are neither perpendicular to, nor parallel to, the plane of motion of the first and second actuators (e.g., the plane along which sliding contact between the first and second actuators and the support bracket occurs). This allows for the latching mechanism to secure and latch components that may interface with the gaming machine cabinet at somewhat arbitrary angles, thereby allowing the design of the gaming machine to utilize non-orthogonal surfaces that may allow the gaming machine to have a more streamlined appearance.

It will also be understood that the trigger pins 430*a* and 430*a* are depicted as cylindrical pins in the figures, the trigger pins 430*a* and 430*b* may also be shoulder screws or other fasteners. It will also be understood that in any instances where there is a linear guide in which one part is constrained to translate along a linear axis relative to another part, the elements of such a linear guide may be arranged such that the guide element is on one part and the guided element on the other, or vice-versa. For example, if components A and B are configured such that one of components A and B may be translated linearly relative to another of components A and B, one such implementation may involve the component A having a linear slot in it and the component B having two pins that protrude into the slot and slidingly engage with the linear slot. However, the same end result may also be reached if the linear slot is instead in the component B and the two pins are instead in component A. Thus, the various specific linear guiding features discussed in the above example, may, it will be appreciated, be reversed as described above.

It is to be understood that the phrases “for each <item> of the one or more <items>,” “each <item> of the one or more <items>,” or the like, if used herein, are inclusive of both a single-item group and multiple-item groups, i.e., the phrase “for . . . each” is used in the sense that it is used in programming languages to refer to each item of whatever population of items is referenced. For example, if the population of items referenced is a single item, then “each”

would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An apparatus comprising:
- a support bracket;
- a first actuator, wherein the first actuator is movably mounted to the support bracket such that the first actuator is movable between a first actuation position relative to the support bracket and a second actuation position relative to the support bracket;
- a plurality of rotary latches, wherein:
  - each rotary latch is mounted to the support bracket,
  - each rotary latch has a corresponding trigger that is movable between an untriggered state and a triggered state,
  - each rotary latch has one or more latching members that are movable between a latched position and an unlatched position,
  - each rotary latch is configured such that the corresponding trigger:
    - obstructs movement of the one or more latching members of that rotary latch from the latched position to the unlatched position when the corresponding trigger of that rotary latch is in the untriggered state and the one or more latching members of that rotary latch are in the latched position, and
    - enables movement of the one or more latch members of that rotary latch from the latched position to the unlatched position when the corresponding trigger of that rotary latch is in the triggered state and the one or more latching members of that rotary latch are in the latched position,
  - the plurality of rotary latches includes at least a first rotary latch and a second rotary latch; and
- a first common actuator bar, wherein:
  - the first common actuator bar is secured to the support bracket such that the first common actuator bar is translatable along a first axis relative to the support bracket,
  - the first common actuator bar is configured to be translatable between a first position relative to the support bracket and a second position relative to the support bracket,
  - the first common actuator bar and the first and second rotary latches are configured such that the first common actuator bar, in moving from the first position to the second position, exerts a lateral force on the triggers of the first and second rotary latches, thereby causing the triggers of the first and second rotary latches to transition from the untriggered state to the triggered state, and
  - the first actuator is kinematically linked to the first common actuator bar such that:
    - the first common actuator bar moves from the first position to the second position responsive to the first actuator being moved from the first actuation position to the second actuation position, and
    - the first common actuator bar moves from the second position to the first position responsive to the first actuator being moved from the second actuation position to the first actuation position.

2. The apparatus of claim 1, wherein the first actuator is constrained to move along a second axis relative to the support bracket.

3. The apparatus of claim 2, wherein the second axis is perpendicular to a first reference plane that is parallel to the first axis.

4. The apparatus of claim 3, further comprising:
- a first sliding member secured to the support bracket such that the first sliding member is translatable along a third axis relative to the support bracket;
- a first driving link having a first end and an opposing second end; and
- a first driven link having a first end and an opposing second end, wherein:
  - the first end of the first driving link is rotatably connected with the first actuator,
  - the second end of the first driving link is rotatably connected with the first sliding member,
  - the first end of the first driven link is rotatably connected with the first sliding member, and
  - the second end of the first driven link is rotatably connected with the first common actuator bar.

5. The apparatus of claim 4, wherein the third axis is perpendicular to a second reference plane that is parallel to the first axis.

6. The apparatus of claim 5, wherein the second axis is at an oblique angle to the second reference plane.

7. The apparatus of claim 4, wherein:
- the first driving link is rotatable relative to the first actuator and about a first rotational axis that is parallel to the first axis, and
- the first driven link is rotatable relative to the first sliding member and about a second rotational axis that is a) parallel to a plane that is parallel to the first axis and b) perpendicular to another plane that is parallel to both the first axis and the third axis.

8. The apparatus of claim 4, further comprising a second common actuator bar, wherein:
- the plurality of rotary latches further includes at least a third rotary latch and a fourth rotary latch, the second common actuator bar is secured to the support bracket such that the second common actuator bar is translatable along a fourth axis relative to the support bracket, the second common actuator bar is configured to be translatable between a third position relative to the support bracket and a fourth position relative to the support bracket, and the second common actuator bar and the third and fourth rotary latches are configured such that the second common actuator bar, in moving from the third position to the fourth position, exerts a lateral force on the triggers of the third and fourth rotary latches, thereby causing the triggers of the third and fourth rotary latches to transition from the untriggered state to the triggered state.

9. The apparatus of claim 8, further comprising a second actuator, wherein:

the second actuator is movably mounted to the support bracket such that the second actuator is movable between a third actuation position relative to the support bracket and a fourth actuation position relative to the support bracket, and the second actuator is kinematically linked to the second common actuator bar such that:

the second common actuator bar moves from the third position to the fourth position responsive to the second actuator being moved from the third actuation position to the fourth actuation position, and the second common actuator bar moves from the fourth position to the third position responsive to the second actuator being moved from the fourth actuation position to the third actuation position.

10. The apparatus of claim 9, wherein the second actuator is constrained to move along a fifth axis relative to the support bracket.

11. The apparatus of claim 10, wherein the fifth axis is perpendicular to a fourth reference plane that is parallel to the fourth axis.

12. The apparatus of claim 11, further comprising:

a second sliding member secured to the support bracket such that the second sliding member is translatable along a sixth axis relative to the support bracket;

a second driving link having a first end and an opposing second end; and a second driven link having a first end and an opposing second end, wherein:

the first end of the second driving link is rotatably connected with the second actuator, the second end of the second driving link is rotatably connected with the second sliding member, the first end of the second driven link is rotatably connected with the second sliding member, and the second end of the second driven link is rotatably connected with the second common actuator bar.

13. The apparatus of claim 12, wherein the sixth axis is perpendicular to a fifth reference plane that is parallel to the fourth axis.

14. The apparatus of claim 13, wherein the fifth axis is at an oblique angle to the fifth reference plane.

15. The apparatus of claim 12, wherein:

the second driving link is rotatable relative to the second actuator and about a third rotational axis that is parallel to the fourth axis, and the second driven link is rotatable relative to the second sliding member and about a fourth rotational axis that is a) parallel to a fifth reference plane that is parallel to the fourth axis and b) perpendicular to a sixth reference plane that is parallel to both the fourth axis and the sixth axis.

16. The apparatus of claim 9, wherein the first actuator is adjacent to the second actuator.

17. The apparatus of claim 10, wherein first actuator is adjacent to the second actuator and the second axis is parallel to the fifth axis.

18. The apparatus of claim 8, further comprising a gaming machine cabinet having a door and a sliding tray, wherein:

the door includes a first latch strike and a second latch strike, the sliding tray includes a third latch strike and a fourth latch strike, the door is movable between an open configuration and a closed configuration, the sliding tray is movable between an extended position and a retracted position, and the support bracket is positioned within the gaming machine cabinet such that, when the door is in the closed configuration and the sliding tray is in the retracted position, the first latch strike engages with, and is secured by, the first rotary latch, the second latch strike engages with, and is secured by, the second rotary latch, the third latch strike engages with, and is secured by, the third rotary latch, and the fourth latch strike engages with, and is secured by, the fourth rotary latch.

19. The apparatus of claim 1, further comprising a gaming machine cabinet having a door, wherein:

the door includes a first latch strike and a second latch strike, the door is movable between an open configuration and a closed configuration, and the support bracket is positioned within the gaming machine cabinet such that, when the door is in the closed configuration, the first latch strike engages with, and is secured by, the first rotary latch and the second latch strike engages with, and is secured by, the second rotary latch.

* * * * *